(12) United States Patent
Murayama et al.

(10) Patent No.: US 6,313,897 B1
(45) Date of Patent: Nov. 6, 2001

(54) RUBBING TREATMENT APPARATUS HAVING ROLLER WITH SPECIFIC IMPLANTING DIRECTIONS OF THE PILE YARNS AND METHOD OF RUBBING

(75) Inventors: Shinichi Murayama, Sakai; Keizo Fujii, Kashiwara; Masashi Higuchi, Yamatokoriyama, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/955,139

(22) Filed: Oct. 21, 1997

(30) Foreign Application Priority Data

Oct. 23, 1996 (JP) .................................................. 8-281151
Dec. 27, 1996 (JP) .................................................. 8-351375

(51) Int. Cl.$^7$ ................................................ G02F 1/1337
(52) U.S. Cl. .......................... 349/126; 349/123; 349/124; 349/125
(58) Field of Search .................................. 349/123–126, 349/155; 156/99

(56) References Cited

U.S. PATENT DOCUMENTS 5,879,497 * 3/1999 Nakahara et al. ...................... 159/99

FOREIGN PATENT DOCUMENTS

| 53084597 | 7/1978 | (JP) . | |
| 362234128A * | 10/1987 | (JP) | ................................ G02F/1/133 |
| A 63-124027 | 5/1988 | (JP) . | |
| A 2-22624 | 1/1990 | (JP) . | |
| U 2-033030 | 3/1990 | (JP) . | |
| 5088179 | 4/1993 | (JP) . | |
| A 5-203955 | 8/1993 | (JP) . | |
| 7036406 | 2/1995 | (JP) . | |
| A 7-168186 | 7/1995 | (JP) . | |
| A 7-281188 | 10/1995 | (JP) . | |
| 40833476A * | 12/1996 | (JP) | ................................ G02F/1/1337 |
| A 9-73087 | 3/1997 | (JP) . | |
| 10246887A * | 9/1998 | (JP) | ................................ G02F/1/1337 |
| 2000029031A * | 1/2000 | (JP) | ................................ G02F/1/1337 |

OTHER PUBLICATIONS

Japanese Office Action pertaining to Application No. 8-281151.
Japanese Office Action pertaining to Application No. 8-351375.

* cited by examiner

*Primary Examiner*—William L. Sikes
*Assistant Examiner*—Julie Ngo
(74) *Attorney, Agent, or Firm*—George W. Neuner; David G. Conlin; Dike, Bronstein, Roberts & Cushman, IP Group

(57) ABSTRACT

A rubbing treatment apparatus and method of rubbing are described. A rubbing roller has a rotation axis and a rubbing cloth wound around its surface. The rubbing cloth is made with pile yarns which are implanted at cyclic intervals in two directions perpendicular to each other. The rubbing roller is used to contact a surface of a film-to-be-processed which is formed so as to cover a plurality of strip-shaped electrodes formed parallel to each other on a substrate, to be moved together with the substrate in relation to each other to perform a rubbing treatment on the surface of the film-to-be-treated. The rotation axis of the rubbing roller is parallel to the surface during the rubbing treatment. An angle $\theta 3$ in a plane parallel to the surface is formed by one of the implanting directions of the pile yarns of the rubbing roller and the longitudinal direction of the strip-shaped electrodes of the substrate and is in a range of from +5 degrees to –5 degrees. An angle $\theta 5$ formed by the direction of a rotation axis of the rubbing roller and one of the implanting directions of the pile yarns is selected to be in a range between 10 and 60 degrees.

7 Claims, 16 Drawing Sheets

Iso Contrast (Co=10)

"PRIOR ART"

12:00視角
9:00視角
3:00視角
6:00視角

RUBBING TREATMENT APPARATUS HAVING ROLLER WITH SPECIFIC IMPLANTING DIRECTIONS OF THE PILE YARNS AND METHOD OF RUBBING

BACKGROUND OF THE INVENTION

1. Field of the Invention

The present invention relates to a rubbing treatment apparatus, a rubbing method and an alignment film forming method for rubbing a predetermined film-to-be-treated so as to form an alignment film of a device which uses a liquid crystal, such as a liquid crystal display device which is used as display means for OA (office automation) equipment such as a word processor and a personal computer. Further, the invention relates to a rubbing cloth and a rubbing roller of a rubbing treatment apparatus. Still further, the invention relates to a liquid crystal display device including an alignment film which is formed through a rubbing treatment which is performed by the rubbing treatment apparatus.

2. Description of the Related Art

In recent years, as OA equipment such as word processors and personal computers has become popular, an increasing attention is placed on a liquid crystal display device which is characterized In lightness and a low power consumption, for example.

A liquid crystal display device is formed by interposing a liquid crystal between a pair of substrate members, at least one of which transmits light. The pair of substrate members is obtained by forming a display electrode on a light transmitting substrate and thereafter forming an alignment film on the substrate which contains the electrode. In an STN (super-twisted nematic) liquid crystal display device, for instance, liquid crystal molecules which are present between the substrate members are aligned as they are twisted in the range of 180 degrees or larger, e.g., 210 to 260 degrees, between the substrate members. The alignment film has a function of aligning the liquid crystal molecules in one direction. To provide for this function, a surface of the alignment film is rubbed by a predetermined rubbing treatment apparatus.

In recent years, as not only as note type personal computers but as thin display means as well, liquid crystal display devices which provide a dot matrix display of the STN type have expanded a market, due to an improvement of display characteristics. A demand for an increase in the screen size and finer structures has been mounting, and therefore, it is important to improve an in-screen uniformity of a display quality, an in-screen uniformity of a display quality for a half tone display in particular, and a contrast ratio.

Since a display quality is related to alignment of liquid crystal molecules within liquid crystal layers of a liquid crystal display device, a rubbing method and a rubbing treatment apparatus for forming an alignment film, which determines alignment, are extremely important.

FIG. 13 is a plan view for explaining rubbing treatment, showing a substrate member 92 at a step of forming an alignment film. The substrate member 92 which will be eventually divided into four substrate members is prepared, a thin film which is formed at a surface of the substrate member 92 is rubbed.

The substrate member 92 includes a substrate 93, external connection terminals 94, and thin films 96. On one surface of the substrate 93 which has a rectangular shape, four sets of the external connection terminals 94 are formed. Further, adjacent to the external connection terminals 94, four rectangular regions 95 are defined. The four edges of each region 95 are parallel to the respective edges of the substrate 93, and the regions 95 correspond to display areas of the liquid crystal display device. A display electrode is formed inside each region 95. The thin films 96 of an alignment film material such as a polyimide resin are formed in the regions 95 which cover the display electrodes and an exposed surface of the substrate 93.

At a step of rubbing treatment, using a rubbing treatment apparatus which will be described later, rubbing treatment is performed on the thin films 96 of the substrate member 92 which has such a structure, thereby obtaining an alignment film. The substrate member 92 as it is after the alignment film is formed is divided so that each divided portion contains each region 95, whereby the substrate members of the liquid crystal display device are obtained.

The rubbing treatment apparatus for rubbing the thin films 96 of the substrate member 92 comprises a stage for mounting the substrate member 92, and a rubbing roller 97. A rubbing cloth is applied on a cylindrical curved surface of the rubbing roller 97, and the rubbing roller 97 is in a contact with one sur face of the substrate member 92 on t he stage. At this step, rubbing treatment is performed in such a manner that the longitudinal direction of the rubbing roller 97 and a predetermined edge of the substrate member 92 intersect at a relatively large crossing angle.

More specifically, in rubbing, the rubbing roller 97 is rotated in a predetermined rotation direction along a circumferential direction with a central axis of the rubbing roller 97 as a rotation center axis so that the curved surface is rubbed against the substrate member 92 with a predetermined pressure, while moving the rubbing roller 97 and the stage relative to a predetermined direction f or movement 98. At this step, a contacting edge 98a where the curved surface of the rubbing roller 97 contacts with the substrate member 92 is expressed by a straight line whose both ends meet the two perpendicular edges of the substrate member 92, or a straight line whose both ends meet the other two opposite edges of the substrate member 92. The direction for movement 98, which is perpendicular to the direction in which the contacting edge 98a extends, is a direction which is at a predetermined angle θ7 with one edge of the substrate member 92. The thin films 96 of the substrate member 92 is entirely rubbed, through the relative motion in the direction for movement 98. A rubbing axis of the alignment film for the substrate members of the liquid crystal display device which is obtained in this method has the predetermined angle θ7 with one edge of the alignment film.

In the rubbing treatment described above, the angle θ7 is determined with an emphasis on a viewing angle characteristic of the liquid crystal display device. More particularly, with respect to a liquid crystal display device which is used as display means for OA equipment, since a user of the de vice generally sits in front of the liquid crystal display device, an excellent viewing angle characteristic is demanded in a 12–6 o'clock direction of the liquid crystal display device.

Thus, when rubbing treatment is performed wit h the angle θ7 of 45 degrees, the length of the contacting edge 98a largely changes during a period from the beginning of the rubbing treatment until the end of the rubbing treatment. This largely changes a contacting surface area of the rubbing roller 97 for the contact with the thin films 96 per unit time, i.e., a substrate area of the substrate member 92 which is processed by rubbing per unit time. A frictional stress which is created by the contact of the substrate member 92 and the rubbing roller 97 is approximately in proportion to the substrate area, and therefore, the frictional stress largely changes during the period from the beginning of the rubbing treatment until the end of the rubbing treatment. More precisely, the frictional stress increases as the substrate area which is rubbed increases, since the beginning of the rubbing treatment until the rubbing roller 97 reaches a central portion of the substrate member 92. Further, after the rubbing roller 97 reaches the central portion of the substrate member 92 until the end of the rubbing treatment, the frictional stress decreases as the substrate area which is rubbed decreases.

When the frictional stress largely changes during the rubbing treatment in this manner, a rotation speed of the rubbing roller 97 which rotates at a predetermined rotation speed changes. That is, the rotation speed of the rubbing roller 97 becomes slow as the frictional stress increases, whereas the rotation speed of the rubbing roller 97 becomes fast as the frictional stress decreases. When the rotation speed changes, the condition of alignment of the alignment film varies, whereby alignment of the liquid crystal molecules becomes irregular and the display quality of the liquid crystal display device accordingly deteriorates.

One control method for preventing a change in the frictional stress during the rubbing treatment is to electrically control the torque, for instance, of a drive system which contains a motor which drives the rubbing roller 97, to thereby keep the rotation speed constant. More precisely, when the rotation speed of the rubbing roller 97 becomes slow as the frictional stress increases, the quantity of electric power which is supplied to the rubbing roller 97 is increased, while when the rotation speed of the rubbing roller 97 becomes fast as the frictional stress decreases, the quantity of the electric power which is supplied to the rubbing roller 97 is decreased, so that the torque of the motor of the drive system is controlled. However, in this method, a delay is easily created between the timing at which the frictional stress upon the rubbing roller 97 changes and the timing at which the torque of the drive system changes so that adjustment of the rotation speed is delayed accordingly, and therefore, it is difficult to sufficiently correct a change in the frictional stress.

Further, since the thin films 96 are formed only in the regions 95 on one surface of the substrate member 92, a boundary between the regions 95 and the remaining region is stepped by an amount equivalent to at least the thickness of the thin films 96. During the rubbing treatment, a portion of the contacting edge 98*a* passes the remaining region as well. When the contacting edge 98*a* passes to the remaining region from the regions 95 or vise versa, the pressure between the rubbing roller 97 and the substrate member 92 changes at the stepped portion between the regions 95 and the remaining region, whereby the frictional stress dramatically changes. The change in frictional stress forces rubbing to vary on the thin film 96 in the vicinity of the stepped portion, and therefore, alignment of the liquid crystal molecules in the liquid crystal display device becomes irregular.

As a first conventional technique regarding the liquid crystal display device described above, Japanese Unexamined Patent Publication JP-A 63-124027 (1988) may be cited. In this publication, to prevent a pressure which is applied to a display surface of a liquid crystal element from creating a defect in alignment of liquid crystal molecules in a liquid crystal layer, a rubbing axis of an alignment film is set approximately parallel to the longitudinal direction of a rectangular substrate. In addition, as a second conventional technique, Japanese Unexamined Patent Publication JP-A 5-203955 (1993) maybe cited. In this publication, to prevent a change in a pressure within cells, and hence, cell thicknesses due to movement of liquid crystal molecules in a liquid crystal layer, a rubbing direction for rubbing an alignment film is set approximately parallel to the longitudinal direction of a strip-shaped electrode of a device.

In these conventional techniques, although a rubbing axis and a rubbing direction of an alignment film of substrate members of a finished liquid crystal display device are set, it is not clear how the positions of substrate members and a rubbing roller are arranged during a production stage. Therefore, when the four edges of the region 95 and the four edges of the substrate member 92 are not set parallel to each other during a production stage, the length of the contacting edge 98*a* largely changes as described earlier. Thus, these two conventional techniques do not consider a frictional stress associated with rubbing, and have different objectives from the invention.

Thus, when surfaces of the thin films 96 of the substrate member 92 are flat, the problem described above arises. In addition, as a demand for an increase in the screen size and finer structures of a finished liquid crystal display device has mounted recently, in order to reduce a load upon a drive voltage because of the resistance of a display electrode, the display electrode tends to be formed into a large film thickness. As a result, a step is created between a surface of a substrate and a surface of the display electrode, and hence, a step in a surface of a thin film which is formed on the display electrode, thereby creating a problem as described below.

FIG. 14 is a plan view for describing a rubbing treatment using a rubbing treatment apparatus according to other conventional technique, showing a substrate member 101 and a rubbing roller 102. In the substrate member 101, display electrodes 104 are formed on one surface of a substrate 103, a film-to-be-treated 105, which is the thin films described above, of a resin such as polyimide is formed covering the display electrodes 104. The rubbing roller 102 is obtained by winding a rubbing cloth 107 around a surface of a roller 106 using a double-coated adhesive tape or the like.

More precisely, while kept in a contact under pressure with a surface of the film-to-be-treated 105, the rubbing roller 102 is rotated about a rotation axis 108 in a predetermined direction 109 at a predetermined speed while concurrently moving the substrate member 101 and the rubbing roller 102 relative to each other, e.g., by moving the rubbing roller 102 in a direction 110, so that the surface of the film-to-be-treated 105 is rubbed in a predetermined direction, and consequently, an alignment film is obtained.

Now, the following conditions are chosen for a liquid crystal display device which provides a dot matrix display. The substrate 103 of the substrate member 101 is rectangular. The electrodes 104 are shaped in the form of a strip, and the longitudinal direction of the electrodes 104 is parallel to one edge 103*a* of the substrate member 103. The rubbing cloth 107 of the rubbing roller 102 is a cloth to which a pile yarn as described later is implanted, and one of implanting directions of the pile yarns is parallel to the rotation axis 108. Further, during the rubbing treatment, the edge 103*a* of the substrate member 103 at which the rubbing treatment is started is at a predetermined angle a with respect to the rotation axis 108. A direction which is perpendicular to the one implanting direction of the pile yarns of the rubbing roller 102 is a rubbing direction 111, which is a direction which is perpendicular to the rotation axis 108 here.

FIG. 15A is a plan view of a fabric 112 of the rubbing cloth 107, and FIG. 15B is a perspective view expanding the fabric 112. The fabric 112 of the rubbing cloth 107 is a cloth in which pile yarns 114, which are bundles of several tens of filaments, are woven with foundation yarns 113 which are woven to extend laterally and vertically in such a manner that the implanting lengths of the pile yarns 114 are uniform. Considering an effective use, the fabric 112 is cut into a rectangle along an implanting direction 115a of the pile yarns 114 and a direction 115b which is perpendicular to the implanting direction 115a in such a manner that the length of one edge of the rectangle is the same as the circumferential length of the roller 106 and the length of other edge is the same as the width-direction length of the roller 106, and thereafter, the fabric 112 is wound and adhered around the roller 106 so that the implanting direction 115a is parallel to the rotation axis 108.

FIGS. 16A to 16D are plan views for describing a liquid crystal display device 116 of the STN type which comprises an alignment film which is formed using the rubbing treatment apparatus according to the conventional technique. As shown in FIG. 16A, with respect to the directions of viewing angles with respect to a display screen of the liquid crystal display device 116, an upward direction, a downward direction, a right-hand side direction and a left-hand side direction in the drawing are 12-o'clock, 6-o'clock, 9-o'clock and 3-o'clock directions. A case in which the direction with the largest contrast ratio is set as the 12-o'clock direction, for example, is called 12-o'clock viewing angle setting. The rubbing direction is selected so that the viewing angles distribute the contrast ratio or the like symmetrical between the upward direction and the downward direction and between the right-hand side direction and the left-hand side direction.

In one substrate member 117, as shown in FIG. 16B, for instance, a strip-shaped electrode 119 is formed on a surface of a substrate 118, an alignment film 120 is formed covering the strip-shaped electrode 119, and the strip-shaped electrode 119 is formed in the direction of an edge 118a of the substrate 118 at which the rubbing treatment is started, namely, in a direction which is perpendicular to the edge 118a which is in the 12-o'clock direction. The rubbing treatment is performed with a rubbing direction 111a at an angle β1 with the edge 118a, whereby the alignment film 120 is formed.

In a similar manner, in other substrate member 121, as shown in FIG. 16C, for instance, a strip-shaped electrode 123 is formed on a surface of a substrate 122, an alignment film 124 is formed covering the strip-shaped electrode 123, and the strip-shaped electrode 123 is formed in parallel to an edge 122a of the substrate 122 at which rubbing treatment is started, namely, in parallel to the edge 122a which is in the 12-o'clock direction. Rubbing treatment is performed with a rubbing direction 111b at an angle β2 with the edge 122a, whereby the alignment film 124 is formed.

With respect to the substrate members 117 and 121 which respectively include the alignment films 120 and 124, as shown in FIG. 16D, the alignment films 120 and 124 are faced with each other, the rubbing directions 111a and 111b are at an angle γ with each other, and the substrate members 117 and 121 are adhered to each other with a liquid crystal disposed between the substrate members 117 and 121, whereby the liquid crystal display device 116 is formed. The angles β1 and β2 are both selected as 30 degrees, for example, whereas the angle γ is selected as 240 degrees. The angle γ is a twist angle between the substrate members of liquid crystal molecules which are interposed between the substrate members 117 and 121.

FIG. 17 is an enlarged cross sectional view of a state during rubbing treatment. While the film-to-be-treated 105 is formed to cover the electrodes 104, since the film thickness of the electrode 104 is selected as 2000 Å to 4500 Å, for instance and the film thickness of the film-to-be-treated 105 is s elected as about 500 Å, for instance, a step due to the electrode 104 is created in the surface of the substrate member 101. The rubbing roller 102 rubs the surface of the substrate member 101 which has such a step, with the pile yarns 114.

FIGS. 18A and 18B are enlarged views of a state during rubbing treatment in the conventional techniques. FIG. 18A is a plan view, and FIG. 18B is a perspective view. The substrate 103 of the substrate member 101 is rectangular, the longitudinal direction of the electrode 104 which is shaped in the form of a strip is parallel to one edge 103a of the substrate 103, one of implanting directions of the pile yarns of the rubbing roller 102 is parallel to the rotation axis 108, and the edge 103a of the substrate 103 at which the rubbing treatment is started is at the predetermined angle α with respect to the rotation axis 108. Since the step described above is created in the surface of the substrate member 101, during the rubbing treatment, as shown in FIG. 18B, pile yarns 114a, 114b and 114c serially contact one edge 125a of a convex portion which forms the step. Further, the pile yarns 114a, 114b and 114c serially leave an edge 125b which is opposite to the edge 125a. This disturbs bristle edges of the pile yarns 114, and hence, a rubbing direction between a central portion of the electrode 104, a peripheral portion of the electrode 104 at which the rubbing treatment is started, and a peripheral portion of the electrode 104 at which the rubbing treatment ends. As described earlier, since the step tends to be large, the disturbance to the rubbing direction becomes remarkable.

In the liquid crystal display device which comprises the alignment film to which such rubbing treatment is performed, alignment of the liquid crystal molecules becomes irregular within a pixel region in which the electrodes of one substrate member and the other substrate member are mutually superimposed, and therefore, the twist angles γ become irregular. Further, this particularly causes a phenomena known as drop-off that pre-tilt angles of pixels in a peripheral portion of the 12-o'clock direction and a peripheral portion of the 6-o'clock direction become larger than a pre-tilt angle of pixels in the central portion and a transmission rate accordingly increases. The pre-tilt angles are angles of the direction of major axes of the liquid crystal molecules with respect to the surfaces of the substrate members.

Further, originally, larger a difference between a pre-tilt angle with a display voltage applied (i.e., with an ON-voltage applied) to the liquid crystal layer and a pre-tilt angle without the display voltage applied (i.e., with OFF-voltage applied), larger a ratio of transmission rates of light, namely, a contrast ratio becomes large. However, as described above, since the pre-tilt angles are irregular within the screen, the difference between the pre-tilt angle wit h the ON-voltage applied and the pre-tilt angle with the OFF-voltage applied is small, and therefore, the contrast ratio decreases.

In addition, a reduction in OFF-voltage accordingly makes the ON-voltage insufficient, and hence, the transmission rate decreases. When the luminance of back light incorporated in the liquid crystal display device is increased to obtain a sufficient luminance with a high transmission rate, a consumption power increases and a continuous drive time becomes short.

Moreover, as a third conventional technique, a method of reducing a disturbance in a rubbing direction is disclosed in Japanese Unexamined Utility Model Publication JP-U 2-033030 (1990). The publication is related to a technique for winding and adhering a rubbing cloth around a roller, and discloses to arrange a bonding edge without a pile yarn at an angle with respect to a rotation axis of a rubbing roller so that portions which do not contact the pile yarn and are not rubbed are scattered to thereby eliminate a portion with successive irregular alignments.

Further, as a fourth conventional technique, the inventor of the invention has proposed other method of reducing a disturbance to a rubbing direction using a technique for winding and adhering a rubbing cloth around a roller, the same as the publication mentioned above in Japanese Unexamined Patent Publication JP-A 9-73087 (1997). More precisely, the publication discloses to wind a rubbing cloth around a roller in such a manner that one of implanting directions of pile yarns is at an angle with respect to a rotation axis of a rubbing roller to thereby increase the density of the pile yarns which contact a substrate member and enhance the uniformity of a rubbing direction.

Still further, as a fifth conventional technique, Japanese Unexamined Patent Publication JP-A 7-281188 (1995) discloses a technique in which a liquid crystal is aligned stably and uniformly with excellent pre-tilt angles by specifying the roughness of a surface of a rubbing cloth of a rubbing roller. As a sixth conventional technique, Japanese Unexamined Patent Publication JP-A 7-168186 (1995) discloses a technique in which the angles of pile yarns with respect to a fabric surface of a rubbing cloth are specified and a direction of rubbing a substrate member and the angles of the pile yarns are made to coincide with each other so that the uniformity of an alignment of liquid crystal is improved. As a seventh conventional technique, Japanese Unexamined Patent Publication JP-A 2-22624 (1990) discloses a technique of obtaining an excellent alignment of liquid crystal with a high in-screen uniformity by setting an angle of a rotation axis of a rubbing roller with respect to a direction which is perpendicular to a constant direction, in which a substrate member is moved while in a contact with the rubbing roller, in the range of ±1 degrees to ±45 degrees.

However, any one of the publications cannot solve the inconveniences which are created due to the positional relationship between the substrate member 101 and the rubbing roller 102 described earlier with reference to FIGS. 18A and 18B.

SUMMARY OF THE INVENTION

Objects of the invention are to provide a rubbing method which allows uniform rubbing of a surface of a film-to-be-treated which is formed on a substrate, and to provide a method of forming an alignment film capable of obtaining an alignment film which is uniformly and entirely aligned with the use of the rubbing method. Further objects of the invention is to provide a rubbing treatment apparatus which performs uniform rubbing on a surface of the film-to-be-treated even when the surf ace is stepped, and to provide a rubbing cloth and a rubbing roller which such a rubbing treatment apparatus is provided with. A still further object of the invention is to provide a liquid crystal display device with improved display quality, comprising an alignment film formed by rubbing treatment using the rubbing treatment apparatus.

The invention provides a rubbing method comprising the steps of:

bringing a curved surface of a cylindrical rubbing roller which rotates in a circumferential direction, into a contact with an entire surface of a plate-like substrate including a surface of a film-to-be treated which is formed in a predetermined region of one surface of the substrate; and moving the substrate and the rubbing roller in relation to each other in a direction perpendicular to an edge of the substrate to rub the surface of the film-to-be treated, wherein the substrate and the rubbing roller are moved in relation to each other, while a length of a contact portion where the substrate surface including the surface of the film-to-be-treated contacts the curved surface of the rubbing roller is kept at an almost constant length.

According to the invention, rubbing treatment of the film-to-be-treated is performed in such a manner that the curved surface of the rubbing roller is brought into contact with the entire surface of the substrate including the surface of the film-to-be-treated on the substrate to rub thereagainst. At this stage, the length of the linearly shaped contacting portion where the entire surface of the substrate including the surface of the film-to-be-treated contacts the curved surface of the rubbing roller is kept at an almost constant length.

During the above-mentioned rubbing, a frictional stress which increases in proportion to the length of the contacting portion is applied to the substrate including the film-to-be-treated and the contacting portion. A change in frictional stress causes a change in rotation speed of the rubbing roller, that is, irregular rubbing. The rubbing method according to the invention can keep the length of the contacting portion almost constant, and therefore, prevent a change in frictional stress. Since this keeps rotation of the rubbing roller constant, it is possible to perform uniform rubbing over the entire surface of the film-to-be-treated.

Further, the invention is characterized in that the substrate is rectangular and an angle θ0 between the direction of movement and one of edges of the substrates is selected to be in a range of from 75 degrees to 90 degrees.

According to the invention, the substrate is rectangular and rubbing treatment is performed at the angle θ0. Since this allows a rotation center axis of the rubbing roller to move approximately parallel to one of the edges of the substrate, it is possible to keep the length of the contacting portion between the substrate and the rubbing roller almost constant over the entire surface of the film-to-be-treated. When an angle of 90 degrees is selected as the angle θ0, in particular, it is possible to always keep the length of the contacting portion always constant. This prevents a change in frictional stress and keeps rotation of the rubbing roller constant, it is possible to perform uniform rubbing over the entire surface of the film-to-be-treated.

Further, the invention provides a method of forming an alignment film, comprising the steps of:

preparing a plate-like rectangular substrate in which a rectangular alignment film formation region which is surrounded by edges parallel to edges of the substrate, respectively, is defined in the substrate;

forming a thin film of an alignment film material in the alignment film formation region on the substrate; and rubbing a surface of the formed thin film by the rubbing method to thereby form the alignment film.

According to the invention, the thin film of the alignment film material is formed in the alignment film formation region on one surface of the substrate, and the thin film is rubbed by the rubbing method to thereby form the alignment film. Since this coincides an angle between the edges of the substrate and the direction of movement with an angle between edges of the thin film and the direction of movement, the direction of movement relative to the substrate coincides with the direction of movement relative to the thin film, and therefore, a change in length of the contacting portion coincides with a change in length of the contacting portion contacting only with the thin film. Hence, it is possible to prevent a change in frictional stress and to obtain an alignment film which is uniformly rubbed. In a liquid crystal display device which comprises such an alignment film, liquid crystal molecules are aligned uniformly, and the uniformity of a display is improved.

Further, the invention provides a method of forming an alignment film, the method comprising the steps of:

preparing a plate-like rectangular substrate in which a rectangular alignment film formation region which i s surrounded by edges parallel to edges of the substrate, respectively, is defined in the substrate;

forming a thin film of an alignment film material in a strip-shaped region formed on the substrate, including the alignment film formation region and extending from one edge of the substrate toward an edge of the substrate opposite to the one edge;

rubbing a surface of the formed thin film by the rubbing method to thereby form the alignment film.

According to the invention, the thin film of the alignment film material is formed in the strip-shaped region, which includes the alignment film formation region and extends from one of the edges of the substrate toward the edge which is opposite to this edge, on one surf ace of the substrate, and a surface of the thin film is rubbed by the rubbing method to thereby form the alignment film.

By forming the thin film into the strip shape in this manner rather than forming the thin films in the respective alignment film formation regions, it is possible to reduce the number of steps between portions of the substrate surface where the thin film is formed and portions of the substrate surface where the thin film is not formed. This reduces a change in frictional stress due to steps, and therefore, it is possible to obtain an alignment film which is more uniformly rubbed. Particularly when the longitudinal direction of the strip-shaped thin film is approximately parallel to the direction in which the rubbing roller is moved, the number of times that the contacting portion moves passing in the direction which is perpendicular to a stepped portion is reduced during the rubbing. Since this further prevents a change in frictional stress, and therefore, it is possible to obtain an alignment film which is more uniformly rubbed.

Hence, in a liquid crystal display device which comprises the alignment film which is obtained by this method, liquid crystal molecules are aligned more uniformly, and the uniformity of a display is further improved.

Further, the invention provides a method of forming an alignment film, comprising the steps of:

preparing a plate-like rectangular substrate in which a rectangular alignment film formation reg ion which is surrounded by edges parallel to edges of the substrate, respectively, is defined in the substrate;

forming a thin film of an alignment film material on one surface of the substrate so as to cover nearly all over the one surface of the substrate including the alignment film formation region; and rubbing a surface of the formed thin film by the rubbing method to thereby form the alignment film.

According to the invention, the thin film of the alignment film material is formed on one surface of the substrate to cover nearly all over the one surface including the alignment film formation region, and the rubbing by the above-mentioned rubbing method is performed to thereby form the alignment film. The thin film may be a region except for a region in which an external connection terminal, which supplies an electric signal from outside to a display electrode which is included in a substrate member, when the substrate member as it is after the alignment film is formed is used as a substrate member for a liquid crystal display device. Since it is possible to further prevent the influence of the steps between the substrate and the thin film upon the rubbing in the invention, a change in frictional stress is further prevented. This makes it possible to obtain an alignment film which is more uniformly rubbed.

Hence, in a liquid crystal display device comprising the alignment film which is obtained by this method, the alignment of liquid crystal molecules is fur the r improved, and higher display quality is obtained.

Further, the invention provides a rubbing treatment apparatus comprising:

a rubbing roller including a rubbing cloth wound around a surface thereof to be adhered thereto, the rubbing cloth including pile yarns which are implanted at cyclic intervals in two directions perpendicular to each other, the rubbing roller for contacting a surface of a film-to-be-processed which is formed so as to cover a plurality of strip-shaped electrodes formed parallel to each other on a substrate, to be moved together with the substrate in relation to each other to thereby perform rubbing treatment on the surface of the film-to-be-treated, wherein an angle θ3 formed by one of the implanting directions of the pile yarns of the rubbing roller and the longitudinal direction of the strip-shaped electrodes of the substrate is selected to be in a range of from −5 degrees to +5 degrees.

According to the invention, since the angle θ3 formed by the one of the implanting directions of the pile yarns of the rubbing roller and the longitudinal direction of the strip-shaped electrodes of the substrate is selected to be in a range of from −5 degrees to +5 degrees, during rubbing treatment, in the surface of the substrate which has a step due to the strip-shaped electrodes, the pile yarns contact one edge of a convex portion which forms the step, at roughly the same time, and leave an edge f aced with this edge, at roughly the same time. This reduces a disturbance to the edges of bristles of the pile yarns and improves an in-screen uniformity of a rubbing direction. Any one of a pair of substrate members forming a liquid crystal display device can be rubbed under the condition, and therefore, it is possible to improve the uniformity.

Further, the invention is characterized in that the strip-shaped electrodes are formed on the substrate so that the longitudinal direction of the strip-shaped electrodes is approximately parallel to one edge of the substrate, and an angle θ4 formed by a rubbing direction, which is perpendicular to one of the implanting directions of the pile yarns of the rubbing roller, and the longitudinal direction of the strip-shaped electrodes is selected to be in a range between 10 degrees and 60 degrees.

According to the invention, as the angle θ4formed by the rubbing direction, which is perpendicular to one of the implanting directions of the pile yarns of the rubbing roller, and the longitudinal direction of the strip-shaped electrodes is selected to be in the range between 10 degrees and 60 degrees, the rubbing treatment is performed in such a manner that the pile yarns contact one edge of a convex portion which forms the step approximately at the same time. This reduces a disturbance to the edges of bristles of the pile yarns and improves an in-screen uniformity of a rubbing direction. Such a condition is appropriate to a liquid crystal display device of the STN type.

Further, the invention is characterized in that an angle θ5 formed by the direction of a rotation axis of the rubbing roller and one of the implanting directions of the pile yarns is selected to be in a range between 10 and 60 degrees.

According to the invention, as the angle θ5 formed by the direction of the rotation axis of the rubbing roller and one of the implanting directions of the pile yarns is selected to be in the range between 10 and 60 degrees, the rubbing treatment is performed in such a manner that the pile yarns contact and leave one edge of a convex portion which forms the step approximately at the same time. This reduces a disturbance to the edges of bristles of the pile yarns and improves an in- screen uniformity of a rubbing direction. Such a condition is appropriate to a liquid crystal display device of the STN type.

Further, the invention provides a rubbing cloth which is rectangular, including pile yarns which are implanted at cyclic intervals in two directions perpendicular to each other, the rubbing cloth being wound around a surface of a roller to be adhered thereto, wherein an angle θ6 formed by one of implanting directions of the pile yarns and one edge of the rubbing cloth is selected to be in a range between 10 and 60 degrees.

According to the invention, it is possible to obtain a rubbing roller around which such a rubbing cloth is wound. Use of the rubbing roller reduces a disturbance to the edges of bristles of the pile yarns, and therefore, it is possible to perform rubbing treatment with an improved in-screen uniformity.

Further, the invention provides a rubbing roller comprising a rubbing cloth wound around a surface of the rubbing roller, the rubbing cloth including pile yarns which are implanted at cyclic intervals in two directions perpendicular to each other,
  wherein the rubbing cloth is rectangular, an angle θ6 formed by one of implanting directions of the pile yarns and respect to one edge of the rubbing cloth is selected to be in a range between 10 and 60 degrees, and the edge of the rubbing cloth is wound parallel to the direction of a rotation axis of the roller.

According to the invention, use of such a rubbing roller reduces a disturbance to the edges of bristles of the pile yarns, and therefore, it is possible to perform rubbing treatment with an improved in-screen uniformity.

In addition, the invention provides a rubbing roller comprising a rubbing cloth wound around a surface of the rubbing roller, the rubbing cloth including pile yarns which are implanted at cyclic intervals in two directions perpendicular to each other,
  wherein the rubbing cloth is rectangular,
  one of implanting directions of the pile yarns is parallel to one edge of the rubbing cloth, and
  the edge of the rubbing cloth is wound spirally with an inclination with respect to the direction of a rotation axis of the roller.

According to the invention, use of such a rubbing roller reduces a disturbance to the edges of bristles of the pile yarns, and therefore, it is possible to perform rubbing treatment with an improved in-screen uniformity.

Further, the invention provides a rubbing method comprising the steps of:
  forming a plurality of strip-shaped electrodes parallel to each other on a substrate;
  forming a film-to-be-treated which is to be rubbed on the substrate so that the film-to-be-treated covers the strip-shaped electrodes; and
  rubbing a surface of the film-to-be-treated using the rubbing treatment apparatus.

According to the invention, during the rubbing treatment, in a surface of a substrate-to-be-processed which has a step due to the strip-shaped electrodes, pile yarns contact one edge of a convex portion which forms the step at roughly the same time and leave an edge which is faced with this edge approximately at the same time. This reduces a disturbance to the edges of bristles of the pile yarns and improves an in-screen uniformity of a rubbing direction.

According to the invention, it is possible to provide a rubbing method which promises such an effect as described above.

Further, the invention provides a liquid crystal display device comprising
  a pair of substrate members, at least either one of the pair of substrate members being capable of transmitting light; and
  a liquid crystal disposed between the pair of substrate members,
  wherein at least either one of the substrate members includes an alignment film which is rubbed using the rubbing treatment apparatus.

According to the invention, in a surface of a substrate member which has a step due to the strip-shaped electrodes, pile yarns contact one edge of a convex portion which forms the step, at roughly the same time, and leave an edge facing the one edge, at roughly the same time. This reduces a disturbance to the edges of bristles of the pile yarns and improves an in-screen uniformity of a rubbing direction.

In a liquid crystal display device which comprises the alignment film which is rubbed in such a fashion, the uniformity of alignment of liquid crystal molecules is improved within a pixel region, and the uniformity of twist angles are improved. In addition, pre-tilt angles within pixels become approximately equal, which in turn suppresses a drop-off phenomena that a transmission rate locally increases. Since this improves the uniformity of the pre-tilt angles within the pixels, a different between the pre-tilt angles with an ON-voltage applied and the pre-tilt angles within the pixels, a different between the pre-tilt angles without an ON-voltage applied becomes sufficiently large, a high contrast ratio is obtained. Since a high contrast ratio is obtained, it is not necessary to increase the luminance of back light incorporated in the liquid crystal display device, and therefore, it is possible to realize a liquid crystal display device which uses a small consumption power and which can be driven successively for long hours.

Further, the invention is characterized in that the liquid crystal which is interposed between the substrate members is an STN liquid crystal with liquid crystal molecules aligned twisted between the substrate members in the range of 210 to 260 degrees.

According to the invention, a liquid crystal display device of the STN type whose display quality is susceptible to an influence of the condition of alignment of the liquid crystal provides an excellent display quality.

BRIEF DESCRIPTION OF THE DRAWINGS

Other and further objects, features, and advantages of the invention will be more explicit from the following detailed description taken with reference to the drawings wherein:

FIG. 12A is a plan view and FIG. 12B is a perspective view;

FIG. 18A is a plan view and FIG. 18B is a perspective view.

DETAILED DESCRIPTION OF THE EMBODIMENTS

Figure 1:
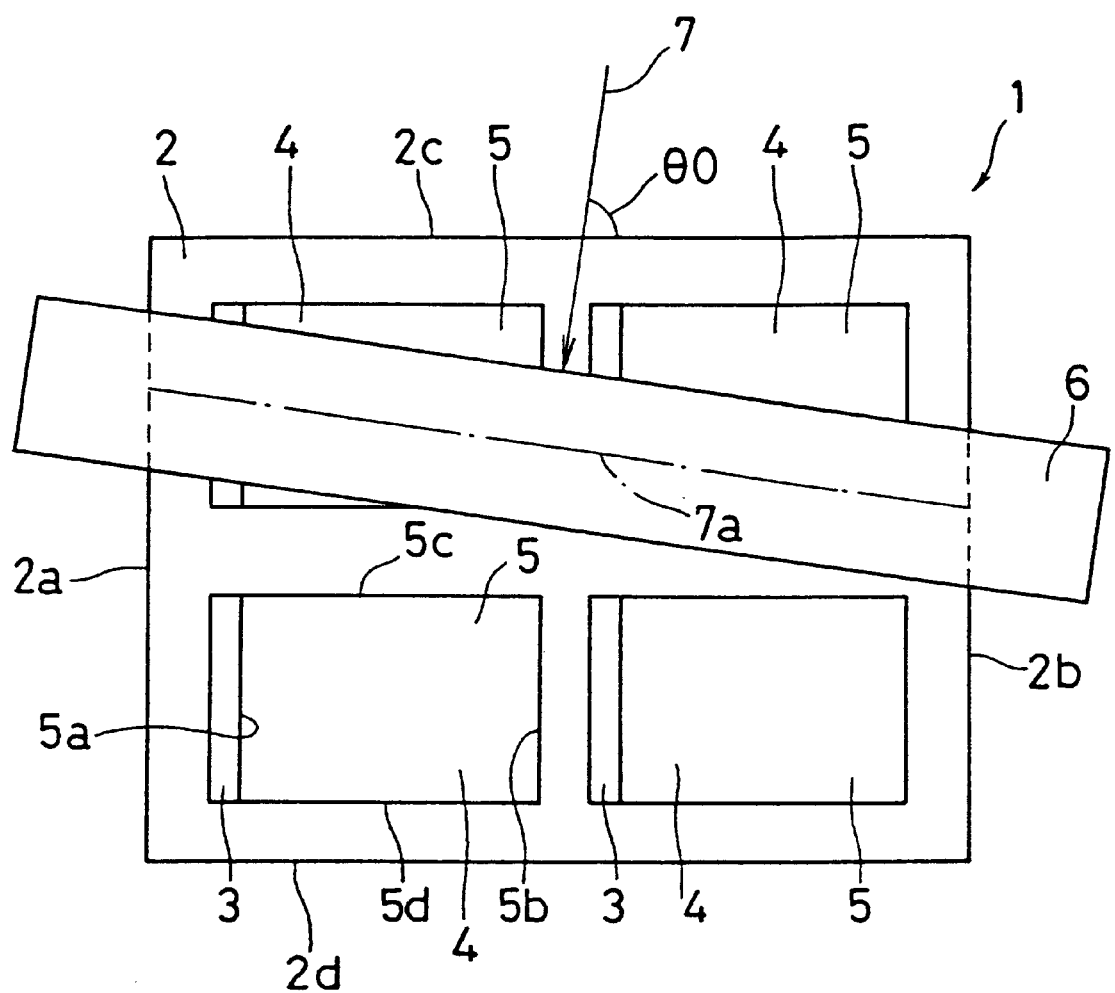
FIG. 1 is a plan view of a substrate member 1 which is used in a method of forming an alignment film according to a first embodiment, of the invention.

Now referring to the drawings, embodiments of the invention are described below.

FIG. 1 is a plan view of a substrate member 1, describing a method of forming an alignment film according to a first embodiment of the invention. In the following, the method of forming an alignment film according to the invention will be described in relation to a step of forming alignment films respectively in a pair of substrate members between which a liquid crystal layer is disposed in a liquid crystal display device. In steps of manufacturing the liquid crystal display device, the substrate member is divided into four after the alignment films are completed to thereby obtain substrate members for the liquid crystal display device.

The step of forming an alignment film is divided into a step of forming a thin film and a step of performing rubbing treatment. At the step of forming a thin film, in the member which is still being fabricated with structural components of the substrate members other than the alignment films formed, thin films made of an alignment film material is formed to cover the structural components and an exposed substrate surface. FIG. 1 shows the substrate member 1 as it is after the thin films are formed.

The substrate member 1 includes a substrate 2, external connection terminals 3, and thin films 5. In one surface of the substrate 2 which is shaped as a plate-like rectangle includes, four rectangular regions 4 are formed which are arranged in a matrix so as to be parallel to the respective edges of the substrate 2. The respective edges of the regions 4 are arranged parallel to the respective edges of the substrate 2. The regions 4 correspond to display areas of the liquid crystal display device. In one surface of the substrate 2, as structural components of the liquid crystal display device, structural components such as display electrodes are formed within the regions 4. Further, adjacent to the regions 4, the external connection terminals 3 which are electrically connected to the electrodes within the regions 4 are formed.

At the step of forming a thin film, the thin films 5 are formed in one surface of the substrate 2 except in the regions where the external connection terminals 3 are formed, in such a manner that the thin films 5 cover at least the structural components within the regions 4 and the exposed surface of the substrate 2. In this embodiment, the thin films 5 are formed so as to cover only inside the regions 4. The thin films are made of an alignment film material such as polyimide, for instance. In this embodiment, the respective edges 5a to 5d of the thin films 5 are parallel to the respective edges 2a to 2d of the substrate 2. The substrate member 1 including the thin films 5 is rubbed using a rubbing treatment apparatus which will be described later, whereby the thin films 5 become alignment films. Now, a description will be given to a case where surfaces of the thin films 5 are formed flat.

The rubbing treatment apparatus for performing rubbing treatment on the substrate member 1 comprises a cylindrical rubbing roller 6 and a stage. The substrate member 1 is mounted and fixed on the stage. A rubbing cloth is adhered to a cylindrical curved surface of the rubbing roller 6, and the curved surface is in a contact with one surface of the substrate member 1 which is mounted on the stage. At this stage, the longitudinal direction of the rubbing roller 6 and a predetermined edge of the substrate member 1 are arranged to intersect at a relatively small crossing angle, or alternatively, to be parallel to each other.

Further, a drive apparatus is attached to the rubbing roller 6, so that the rubbing roller 6 rotates with a central axis line of the cylindrical rubbing roller 6 as a rotation center axis line, in a predetermined direction of rotation along a circumferential direction at a predetermined rotation speed. The rotation speed of the rubbing roller 6 is selected to be in the range between 500 rpm and 2,000 rpm. In addition, the drive apparatus moves the rubbing roller 6 in a direction of movement 7 which will be described later along one surface of the substrate member 1 while urging the rubbing roller 6 as a whole against the substrate member 1 which is mounted on the stage at a predetermined pressure.

Specifically describing, at the step of rubbing treatment, the substrate member 1 is held between the rubbing roller 6 and the stage, and while rotating the rubbing roller 6 about the rotation center axis line of the rubbing roller 6, the rubbing cloth on the curved surface of the rubbing roller 6 is brought into a contact with the surface of the substrate member 1 at a predetermined pressure and rubbed against the surfaces of the thin films 5. Further, the rubbing roller 6 and the stage are moved in the predetermined direction of movement 7 so that a contacting edge 7a moves in a parallel fashion from the edge 2c to the opposite edge 2d of the substrate 2. The contacting edge 7a is a contacting portion where the curved surface of the rubbing roller 6 contacts the substrate member 1, and is expressed as a straight line whose ends are opposite two edges of the substrate 2 or two perpendicular edges of the substrate 2. In this embodiment, a structure of the rubbing treatment apparatus will be described as a structure in which the stage is fixed and the rubbing roller 6 is moved. However, the structure of the rubbing treatment apparatus is not limited to this, but rather may be any structure in which the contacting edge 7a is movable, e.g., a structure in which the rubbing roller 6 is fixed and the stage is moved.

An angle θ0 of the edge 2c of the substrate 2 at which rubbing treatment upon the substrate member 1 is started with respect to the direction of movement 7 for moving the rubbing roller 6 is selected to be in the range between 75 degrees and 90 degrees. The reason for defining the range of the angle as such will be described later. In a case where the angle θ0 is selected as an angle other than 90 degrees within the range above, the both ends of the contacting edge 7a are defined by a pair of parallel edges 2a, 2b, which crosses the edges 2c, 2d at right angles, except when the contacting edge 7a is in the vicinity of the edges 2c, 2d. Hence, the length of the contacting edge 7a while in motion during the rubbing treatment is kept almost constant. Further, when the angle θ0 is selected as 90 degrees, the both ends of the contacting edge 7a are always the edges 2a, 2b, from the beginning of the rubbing treatment until the end of the rubbing treatment, and therefore, the length of the contacting edge 7a is always kept equal.

When the length of the contacting edge 7a is kept unchanged, a contacting area where the substrate member 1 contacts the curved surface of the rubbing roller 6 per unit time, that is, a substrate surface area which is rubbed by the rubbing roller 6 per unit time remains approximately equal regardless of time. That is, when the angle θ0 is selected as 75 degrees, for instance, the substrate surface area dramatically increases with time immediately after the start of the rubbing treatment since the both ends of the contacting edge 7a are the edges 2b, 2c which are perpendicular to each other, but dramatically decreases with time immediately before the end of the rubbing treatment since the both ends of the contacting edge 7a are the edges 2d, 2a which are perpendicular to each other. Further, at a stage except for the above-mentioned stages during the rubbing treatment, since the both ends of the contacting edge 7a are the edges 2a, 2b, the substrate surface area is kept unchanged regardless of time.

During the step of rubbing treatment described above, a frictional stress which increases in proportion to the substrate surface area is applied upon the substrate member 1 and the rubbing roller 6. As described above, at a stage except for at least immediately after the start of the rubbing treatment and immediately before the end of the rubbing treatment, the substrate surface area is kept unchanged, and therefore, a frictional stress is also kept unchanged. Thus, by defining the direction of moving the contacting edge 7a, i.e., the direction of movement 7 for moving the rubbing roller 6 so as to satisfy the relationship, it is possible to prevent a frictional stress during the rubbing treatment from changing during the rubbing treatment which is performed on the single substrate member.

Although the frictional stress changes the rotation speed of the rubbing roller 6, in the rubbing method according to this embodiment, since the frictional stress is kept equal approximately throughout the step of rubbing treatment, it is possible to keep the rotation speed of the rubbing roller 6 constant. As a result, the thin films 5 which are formed on the substrate 2 is rubbed uniformly, and therefore, it is possible to obtain alignment films whose surfaces are processed uniformly. In addition, lagging axes of the alignment films which are formed by the rubbing treatment is parallel to the direction of movement 7.

Figure 2:
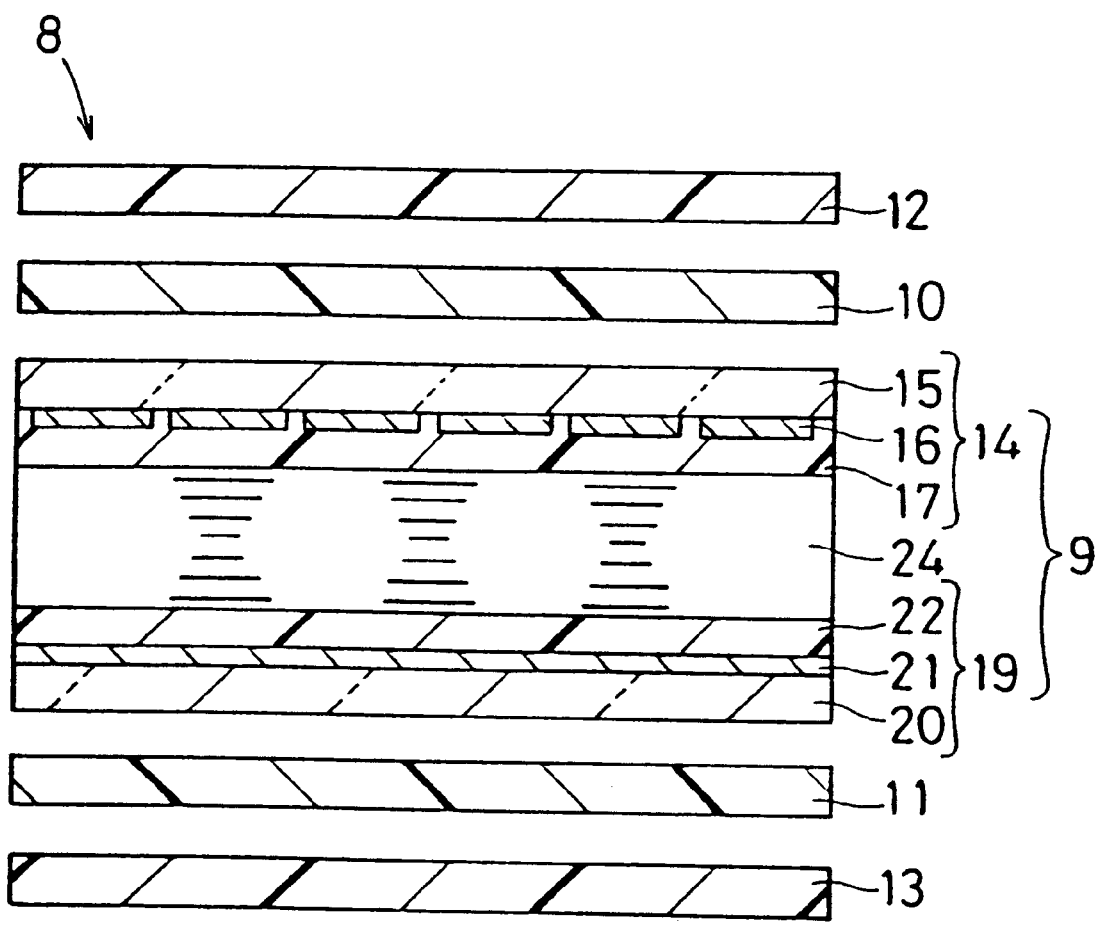
FIG. 2. is an exploded cross sectional view showing a liquid crystal display device 8 which is fabricated using a manufacturing method including the method of forming an alignment film according to the first embodiment.

FIG. 2 is an exploded cross sectional view showing a liquid crystal display device 8 which is fabricated through manufacturing steps which include the step of forming an alignment film using the method of forming the alignment film. The liquid crystal display device 8 is a liquid crystal display device of the STN type, for instance. The liquid crystal display device 8 comprises a liquid crystal display element 9, a pair of phase contrast plates 10, 11, and a pair of polarization plates 12, 13. The liquid crystal display element 9 is disposed between the polarization plates 12, 13. The phase contrast plates 10, 11 are disposed between the liquid crystal display element 9 and the polarization plates 12, 13.

The liquid crystal display element 9 includes a substrate member 14, the other substrate member 19, and a liquid crystal layer 24 which is held between the substrate members 14 and 19. The substrate member 14 includes a plate-like light transmitting substrate 15, a plurality of strip-shaped electrodes 16, an alignment film 17, and an external connection terminal, and is structured in such a manner that the alignment film 17 covers surfaces of the plurality of electrodes 16 which are formed in one surface of the substrate 15 as well as one surface of the substrate 15 which is exposed. Meanwhile, the substrate member 19 includes a plate-like light transmitting substrate 20, a plurality of strip-shaped electrodes 21, an alignment film 22, and an external connection terminal, and has a similar structure to that of the substrate member 14. A twist angle of the liquid crystal layer 24 is selected as 260 degrees, for instance. The twist angle is an angle between major axes of two liquid crystal molecules which are most adjacent to the substrate members 14 and 19, respectively, out of liquid crystal molecules within the liquid crystal layer 24, as viewed from the direction of normal lines of the substrate members 14 and 19.

During the steps of fabricating the liquid crystal display element 9, first, at a step of fabricating substrate members which will be described later, one substrate member and the other substrate member are formed. Of these fabrication steps, a step of forming an alignment film is the same as the step of forming an alignment film which is shown in FIG. 1. Following this, one substrate member 14 and the other substrate member 19 which are formed are arranged with a predetermined space between the same in such a manner that one surfaces of the substrates 15 and 20 seating the alignment films 17 and 22 are faced with each other and that the longitudinal directions of the strip-shaped electrodes 16 and 21 are perpendicular to each other, and a liquid crystal is sealed in the space between one substrate member 14 and the other substrate member 19, whereby the liquid crystal layer 24 is formed. Through such a step, the liquid crystal display element 9 is completed.

Now, a detailed description will be given on steps of fabricating the one substrate member 14 and the other substrate member 19. The one substrate member 14 and the other substrate member 19 are fabricated through steps of fabricating substrate members including the step of forming an alignment film as shown in FIG. 1. That is, the one substrate member 14 and the other substrate member 19 are obtained in such a manner that strip-shaped electrodes 16 and 21, the external connection terminals, and alignment films 17 and 22 are respectively formed on substrates 15A and 20A which are respectively equivalent in size to four substrates 15 and four substrates 20, and then the substrates 15A and 20A are each divided into four.

Figure 3A:
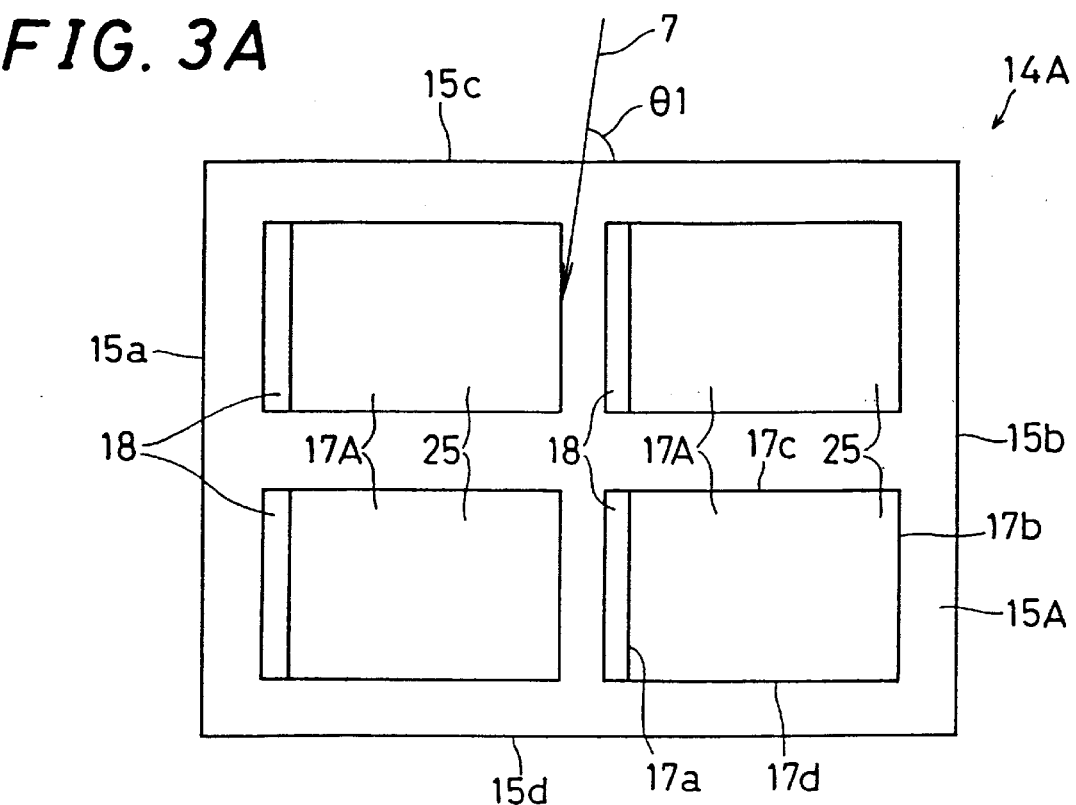
FIG. 3A is a plan view of one of substrate members 14A which is used in the method of forming an alignment film according to the first embodiment.

FIG. 3A is a plan view of an substrate member 14A which is prepared for the purpose of the step of rubbing treatment which is included in the step of fabricating the one substrate member 14. The substrate member 14A is a member which is obtained after completing the thin films at the step of forming an alignment film, and a structure of the substrate member 14A is equal to that of the substrate member 1 which is shown in FIG. 1. Structural components having the same structures will be referred to the same names, and a detailed description thereon will be simply omitted.

The substrate member 14A includes an substrate 15A, external connection terminals 18, and thin films 17A. On one surface of the substrate 15A which is shaped as a rectangular plate, four regions 25 which correspond to display areas of the liquid crystal display device 8 are arranged in a matrix form. Among edges 15a to 15d of the substrate 15A, the edges 15a and 15b are parallel to each other while the edges 15c and 15d are parallel to each other, and the edges 15a and 15c are perpendicular to each other.

The plurality of strip-shaped electrodes 16 which are not shown in FIG. 3A are formed within the regions 25 of the substrate 15A to be parallel to the longitudinal direction of the regions 25. The external connection terminals 18 are formed in edge portions of one side in the direction of widths of the regions 25, so as to be connected to edge portions of one side in the longitudinal direction of the strip-shaped electrodes 16. Further, the thin films 17A are formed in one surface of the substrate 15A to cover the four regions 25. The respective edges 15a to 15d of the substrate 15A are parallel to the respective edges 17a to 17d of the thin films 17A.

At the step of rubbing treatment, using the rubbing treatment apparatus described earlier, the substrate member 14A on which the thin films 17A are formed is rubbed by the rubbing method described with reference to FIG. 1, whereby the thin films 17A become the alignment film 17. At this stage, the angle θ1 between the edge 15c at which the rubbing treatment is started on the substrate member 14A and the direction of movement 7 for moving the rubbing roller 6 is selected as 85 degrees from the edge 15c in the counter-clockwise direction. This allows the edge 15c to be rubbed approximately in the direction perpendicular to the edge 15c.

Figure 3B:
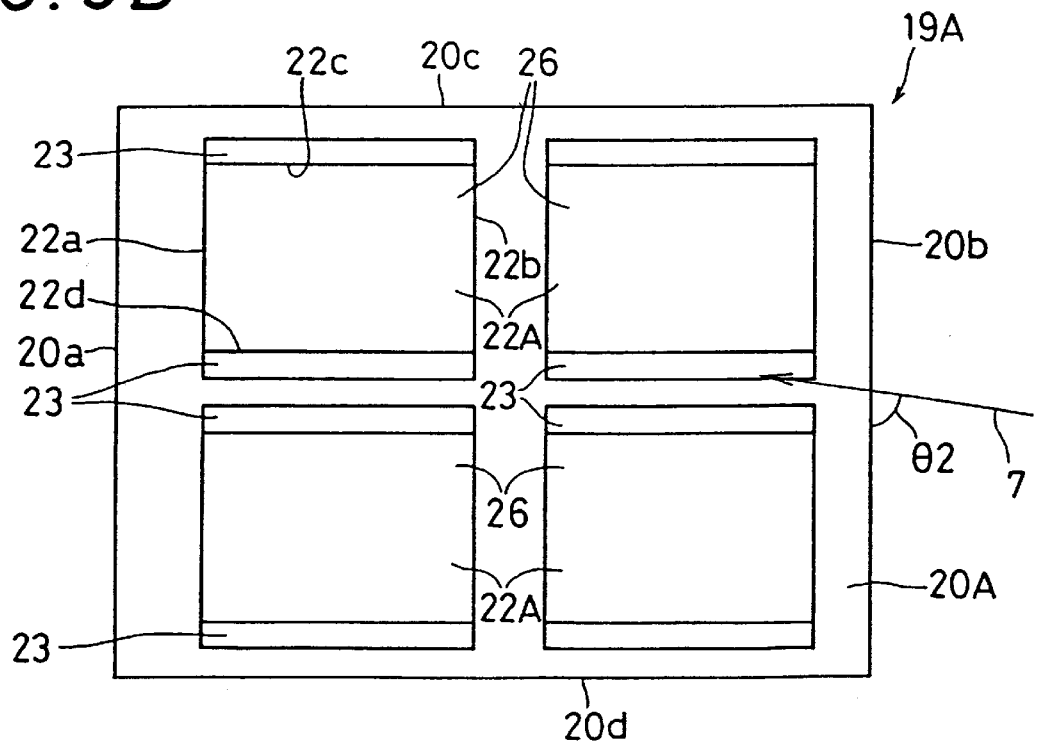
FIG. 3B is a plan view of the other substrate member 19A which is used in the method of forming an alignment film according to the first embodiment.

FIG. 3B is a plan view of the substrate member 19A which is prepared for the purpose of the step of rubbing treatment which is included in the step of fabricating the other substrate member 19. The substrate member 19A is a member which is obtained after completing the thin films at the step of forming an alignment film, and is the same in structure to that of the substrate member 1 except for the positions at which the external connection terminals are formed and the arrangement of the electrodes. Structural components having the same structures will be referred to the same names, and a detailed description thereon will be simply omitted.

The substrate member 19A includes a substrate 20A, external connection terminals 23, and thin films 22A. In one surface of the substrate 19A which is shaped as a rectangular plate, four regions 26 which correspond to display areas of the liquid crystal display device 8 are arranged in a matrix. Among edges 20a to 20d of the substrate 20A, the edges 20a and 20b are parallel to each other while the edges 20c and 20d are parallel to each other, and the edges 20a and 20c are perpendicular to each other.

The plurality of strip-shaped electrodes 21 which are not shown in FIG. 3B are formed within the respective regions 26 of the substrate 20A to be perpendicular to the longitudinal direction of the regions 26. The external connection terminals 23 are formed in the both edge portions of the regions 26 in the longitudinal direction of the regions 26, so as to be connected to the both edge portions of the strip-shaped electrodes 21 in the longitudinal direction. Further, the thin films 22A are formed on one surface of the substrate 20A to cover the four regions 26. The respective edges 20a to 20d of the substrate 20A are parallel to the respective edges 22a to 22d of the thin films 22A.

At the step of rubbing treatment, using the rubbing treatment apparatus described earlier, the substrate member 19A on which the thin films 22A are formed is rubbed by the rubbing method described with reference to FIG. 1, whereby the thin films 22A become the alignment film 22. At this stage, the angle θ2 between the edge 20b at which the rubbing treatment is started on the substrate 20A and the direction of movement 7 for moving the rubbing roller 6 is selected as 85 degrees from the edge 20b in the counter-clockwise direction. As a result rubbing treatment is performed in a direction nearly perpendicular to the edge 22d.

The pair of substrate members 14A and 19A including the alignment films which are obtained by the method described above are divided into four so as to respectively include one region 25 and one region 26 as described above, whereby the one substrate member 14 and the other substrate member 19 are obtained. In order to seal a liquid crystal, the one and other substrate members 14 and 19 obtained are arranged with one surfaces of the substrates 15 and 20 faced with each other, for example, in such a manner that the other substrate member 19 is arranged in a similar manner as that shown in FIG. 3B, while the one substrate member 14 is arranged in a reversed manner to that shown in FIG. 3A with respect to the edge 15b. As a result, in the one and other substrate members 14 and 19 after liquid crystal sealing, the edges 15a and 20b; the edges 15b and 20a; the edges 15c and 20c; the edges 15d and 20d are respectively parallel to each other.

An angle between the rubbing axes of the alignment films 17 and 22 in such an arrangement is 260 degrees as viewed from the direction of normal lines of the substrate members 14 and 19, since rubbing axes are parallel to the direction for moving the rubbing roller 6. Hence, the twist angle of the liquid crystal molecules of the liquid crystal layer which is held between the substrate members 14 and 19 is 260 degrees.

In the following, a description will be given on a method of forming an alignment film according to a second embodiment of the invention. The method of forming an alignment film according to this embodiment is characterized in that regions where the thin films are formed in the substrates 15A and 20A of FIGS. 3A and 3B are different from those in the precedent embodiment. The description in the following will be given in relation to the step of forming an alignment film which is executed during the steps of fabricating the one substrate member 14 and the other substrate member 19 of the liquid crystal display device 8. This embodiment as well assumes that the surfaces of the thin films are flat.

Figure 4A:
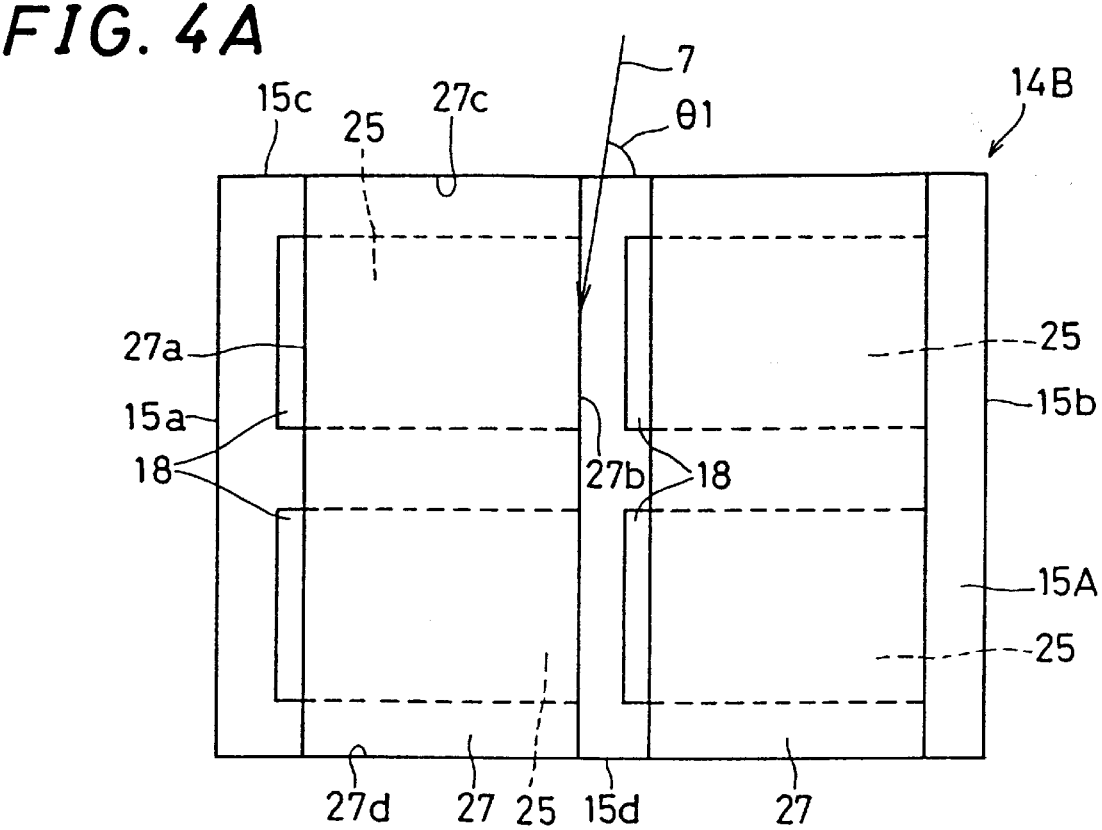
FIG. 4A is a plan view of one of substrate members 14B which is used in a method of forming an alignment film according to a second embodiment of the invention.

FIG. 4A is a plan view of a substrate member 14B which is obtained at the step of forming a thin film during the step of fabricating the one substrate member 14. The substrate member 14B is the same in terms of the structures and the arrangement of the structural components as the substrate member 14A of the precedent embodiment except for the thin films, and therefore, similar structural components will be referred to by the same reference symbols and a detailed description will be simply omitted.

At the step of forming a thin film, strip-shaped thin films 27 are formed to cover the plurality of regions 25. The thin films 27 which are formed are made of the alignment film material described earlier. More precisely, on one surface of the substrate 15A except on the external connection terminals 18, the thin films 27 are formed covering the plurality of regions 25 which are arranged parallel to each other, one surface of the substrate 15A which is exposed between the regions 25, and one surface which is exposed between the regions 25 and the edges 15c and 15d of the substrate 15A. The respective edges 15a to 15d of the substrate 15A are parallel to the respective edges 27a to 27d of the thin films 27.

Hence, the thin films 27 are formed into the strip shape in regions from the end of the edge 15c side of the substrate 15A to the end of the edge 15d side of the substrate 15A, which regions covers at least the region 25 except on the external connection terminal 18 in such a manner that the longitudinal direction of the thin films 27 is parallel to the edges 15a and 15b of the substrate 15A which are perpendicular to the edges 15c and 15d of the substrate 15A.

Figure 4B:
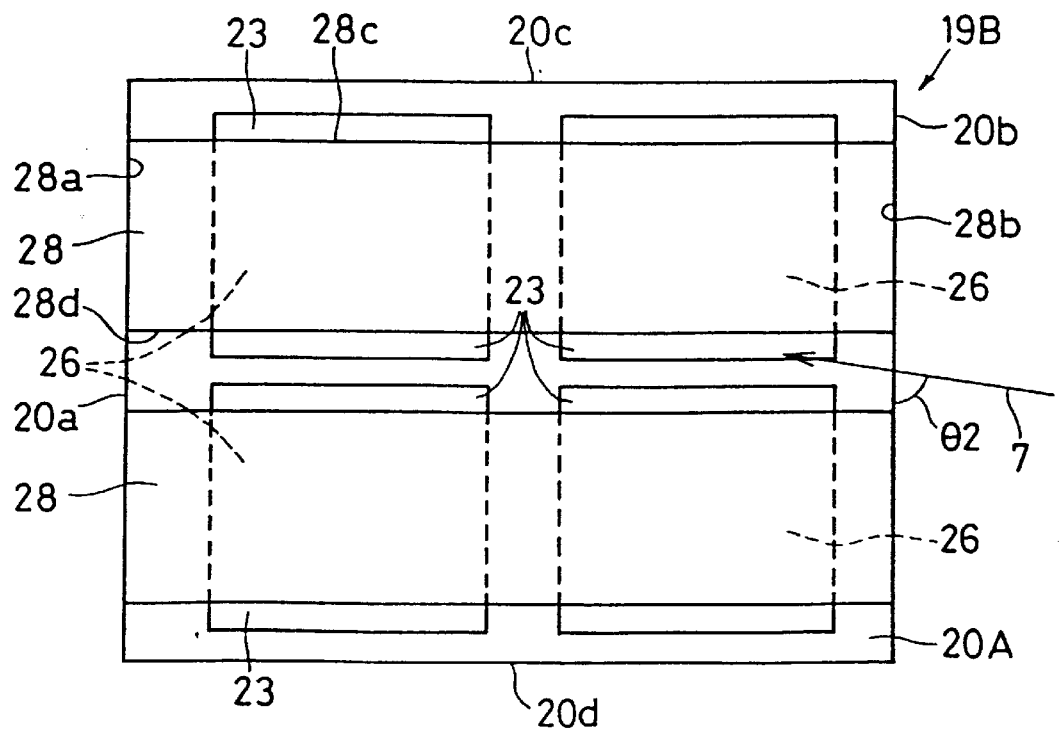
FIG. 4B is a plan view of the other substrate member 19B which is used in the method of forming an alignment film according to the second embodiment of the invention.

FIG. 4B is a plan view of a substrate member 19B which is obtained at the step of forming a thin film during the step of fabricating the other substrate member 19. The substrate member 19B is the same in terms of the structures and the arrangement of the structural components as the substrate member 19A of the precedent embodiment except for the thin films, and therefore, similar structural components will be referred to by the same reference symbols and a detailed description will be simply omitted.

At the step of forming a thin film, strip-shaped thin films 28 are formed to cover the plurality of regions 26. The thin films 28 which are formed are made of the alignment film material described earlier. More precisely, on one surface of the substrate 20A except on the external connection terminals 23, the thin films 28 are formed covering the plurality of regions 26 which are arranged parallel to each other, one surface of the substrate 20A which is exposed between the regions 26, and one surface which is exposed between the regions 26 and the edges 20a and 20b of the substrate 20A.

The longitudinal direction of the external connection terminals 23 of the other substrate member 19B is parallel to the longitudinal direction of the substrate 20A. Hence, the thin films 28 are formed in strip-shaped regions whose longitudinal direction is parallel to the longitudinal direction of the substrate 20A. More particularly, the edges 20c and 20d of the substrate 20A are parallel to edges 28c and 28d of the thin films 28, and the edges 20a and 20b coincide with edges 28a and 28b of the thin films 28.

The rubbing treatment method for the substrate members 14B and 19B including the thin films which are formed in the manner described above is the same as that of the first embodiment, and so are the positional relationships between the direction of movement 7 and the edges of the substrates 15A and 20A. Hence, in the step of rubbing treatment in this embodiment, the substrate members 14B and 19B are rubbed in a condition that the longitudinal direction of the thin films 27 and 28 is approximately parallel to the direction of movement 7.

Although the number of the regions 25 is equal to the number of the regions 26, the substrate members 14B and 19B in which the thin films 27 and 28 are formed in the shape of strips contain less number of the thin films than the substrate members 14A and 19A of the first embodiment, and includes less areas without the thin films. This reduces the number of stepped portions which are created in the substrate members 14B and 19B by the substrates and the thin films, as compared in the substrate members 14A and 19A. Therefore, not only a change in a frictional stress which is created due to the length of the contacting edge 7a described earlier can be prevented, but also a change in a frictional stress which is created when the rubbing roller moves passed steps can be prevented. Hence, it is possible to obtain alignment films which are more uniformly rubbed.

Further, where the direction of movement 7 is approximately parallel to the longitudinal direction of the thin films 27 and 28, it is possible to reduce the number of passage of the rubbing roller through the steps formed by the substrate 15A and the thin film 27 and by the substrate 20A and the thin film 28, in the direction perpendicular to the steps during the rubbing treatment. Therefore, since a change in a frictional stress can be prevented more than in the first embodiment, it is possible to rub the substrate members even more uniformly.

The region where the thin films which become the alignment films are formed may be present on the entire surfaces of the substrates 15A and 20A except on the external connection terminals, other than the regions shown in FIGS. 3A, 3B, 4A and 4B. In the rubbing treatment in this case, since the region where the thin films are not formed is further reduced, it is possible to further prevent a change in frictional stress which is created when the step created by the substrate and thin film is passed. This makes it possible to obtain alignment films which are even more uniformly rubbed.

Next, evaluation results regarding the uniformity of the alignment films which are obtained by the method of forming an alignment film according to the first and the second embodiments above will be described.

First, as examples to be compared with the alignment films which were obtained by the embodiments, two types of liquid crystal display devices which comprise alignment films which were obtained by the conventional method of forming an alignment film were prepared. The methods of forming an alignment film in the examples are different from the methods of forming an alignment film according to the first and the second embodiments above only concerning the angle of the direction of movement 7 with respect to the substrates, but other conditions and methods are the same.

Specifically describing, a first example for comparison is approximately the same as the manufacturing method according to the first embodiment. With respect to the direction of movement 7, the angle θ1 between the edge 15c of the substrate 15A which is shown in FIG. 3A at which rubbing treatment was started and the direction of movement 7 was set as 40 degrees from the edge 15c in the counter-clockwise direction, and the angle θ2 between the edge 20b of the substrate 20A which is shown in FIG. 3B at which rubbing treatment was started and the direction of movement 7 was set as 130 degrees from the edge 20b in the counter-clockwise direction.

Meanwhile, a second example for comparison is approximately the same as the manufacturing method according to the second embodiment. With respect to the direction of movement 7, the angle θ1 between the edge 15c of the substrate 15A which is shown in FIG. 4A at which rubbing treatment was started and the direction of movement 7 was set as 40 degrees from the edge 15c in the counter-clockwise direction, and the angle θ2 between the edge 20b of the substrate 20A which is shown in FIG. 4B at which rubbing treatment was started and the direction of movement 7 was set as 130 degrees from the edge 20b in the counter-clockwise direction.

The uniformity of the alignment films is evaluated based on a distribution of lagging axes of the alignment films and a luminance distribution of the liquid crystal display device which comprises the substrate materials which include the alignment films.

The distribution of the lagging axes was measured by measuring the angles of the lagging axes of a plurality of points which were selected optionally on the alignment films under measurement, using an automatic compound refraction measurement apparatus having a high sensitivity which adopts PEM (Photo Elastic Modulator). As a method of evaluating the distribution of the lagging axes, using variations in the angles of the lagging axes as an indicator, standard deviations of the measured angles were calculated and compared with each other.

Table 1 shows the standard deviations of the lagging axes of the alignment films of the substrate members which are obtained by the methods of forming an alignment film according to the embodiments and the examples for comparison.

TABLE 1

| | Standard Deviation Of Lagging Axes (degrees) |
|---|---|
| Embodiments | 1.75 |
| Examples For Comparison | 5.87 |

The measurements are that the standard deviation of the lagging axes is 1.75 degrees in the embodiments but is 5.87 degrees in the examples for comparison. Thus, the standard deviation of the lagging axes is smaller in the embodiments than in the examples for comparison which are the conventional techniques, and therefore, it is possible to obtain alignment films which are more uniformly rubbed with less variations in the lagging axes in the embodiments.

Meanwhile, the luminance distribution was measured by preparing a liquid crystal display device which was formed using the substrate members which include the alignment films under measurement, keeping the device in a dark display condition which allows light from outside the device to transmit, and measuring the luminances at a plurality of points which were selected optionally in display areas of the liquid crystal display device in this condition. As a method of evaluating the luminance distribution, using variations in the luminances at the measurement points as an indicator, standard deviations of the measured luminances were calculated and compared with each other.

Table 2 shows the evaluation results regarding the standard deviations of the luminances in the liquid crystal display element 9 which uses the substrate members which include the alignment films which are formed by the methods of forming an alignment film according to the embodiments and the examples For comparison.

TABLE 2

| | Standard Deviation Of Luminances (cd/m$^2$) |
|---|---|
| Embodiments | 3.82 |
| Examples For comparison | 6.06 |

The standard deviation of the luminances was 3.82 cd/m$^2$ in the embodiments but was 6.06 cd/m$^2$ in the examples for comparison. Thus, since the standard deviation of the luminances is smaller in the liquid crystal display device which comprises the alignment films which are formed in the embodiments than in the liquid crystal display device which comprises the alignment films which are formed in the examples for comparison, it is found that the luminances vary less in the embodiments. Therefore, The manufacturing method of manufacturing a liquid crystal display device which comprises the alignment films which are formed in the embodiments can provide a liquid crystal display element which has an improved display quality as compared in the manufacturing method of manufacturing a liquid crystal display device which comprises the alignment films which are formed in the examples for comparison.

Now, a description will be given on the reason that the angles θ1 and θ2 between the edge at which rubbing treatment is started and the direction of movement 7 is set in the range of 75 degrees to 90 degrees. Most preferably, the angles θ1 and θ2 are 90 degrees. In this case, the length of the contacting edge where a substrate under rubbing and the rubbing roller is always constant, and therefore, a change in a frictional stress can be prevented most reliably. Hence, closer to 90 degrees the angles θ1 and θ2 are, more preferably. However, where the regions 25 and 26 which are set on the substrates 15A and 20A are analogous to the substrates 15A and 20A with the respective edges set parallel and the substrate members of a liquid crystal display device of the STN type are to be formed, to ensure that the twist angles of liquid crystal molecules of a liquid crystal layer, the angles θ1 and θ2 must be an angle other than 90 degrees.

To identify the range of the angles θ1 and θ2 of rubbing which can make a change in a frictional stress almost constant, a plurality of liquid crystal display devices were fabricated in reality and alignment films of the liquid crystal display devices were evaluated. More precisely, using the steps of fabricating a liquid crystal display device which include the method of forming an alignment film according to the first embodiment, liquid crystal display devices were prepared by three types of methods of forming, i.e., where the angles θ1 and θ2 are set as 85 degrees, where the angles θ1 and θ2 are set as 75 degrees, and where the angle θ1 is set as 90 degrees while the angle θ2 is set as 80 degrees. Further, using the steps of fabricating a liquid crystal display device which include the method of forming an alignment film according to the conventional techniques, a liquid crystal display device for comparison was prepared with the angle θ1 set as 40 degrees and the angle θ2 set as 130 degrees. With respect to these liquid crystal display devices, variations in the lagging axes of the alignment films, the luminance distribution of the liquid crystal display element and the like were measured and evaluated.

As a result, it was found out that the alignment films of the liquid crystal display devices according to the three embodiments provide a better display quality and these alignment films are more uniformly rubbed than the alignment films of the liquid crystal display device according to the example for comparison where the angle θ1 is 40 degrees and the angle θ2 is 130 degrees. It then follows that it is possible to obtain a sufficient effect even when the angles θ1 and θ2 are 75 degrees.

Next, a viewing angle characteristic of the liquid crystal display devices which are formed by the methods of forming an alignment film above will be described. The liquid crystal display device which was used to study the viewing angle characteristic is different from the liquid crystal display device 8 which is shown in FIG. 2 concerning only the rubbing axes of the alignment films, namely, the direction of movement 7 at the step of rubbing treatment, but is otherwise the same as the liquid crystal display device which has been described in relation to the first embodiment. Further, the positional relationship between the phase contrast plates, the polarization plates and the liquid crystal display element in the liquid crystal display device 8 is the same as that in the liquid crystal display device of the STN type according to the conventional techniques. In the following, only different points will be described.

At the step of fabricating the one substrate member 14 of this liquid crystal display device, the edge 15b shown in FIG. 3A was where rubbing treatment was started, and the direction of movement 7 was selected as the direction in which the angle θ1 was 85 degrees from the edge 15b in the counter-clockwise direction. At the step of fabricating the other substrate member 19, the edge 20c shown in FIG. 3B was where rubbing treatment was started, and the direction of movement 7 was selected as the direction in which the angle θ2 was 85 degrees from the edge 20c in the counter-clockwise direction. Further, when the substrate members 14 and 19 were adhered to each other, the one substrate member 14 was reversed with respect to the edge 15d.

Hence, defining the direction of the shorter edges of the other substrate member 19 as a 12–6 o'clock direction and the longitudinal direction of the other substrate member 19 as a 9–3 o'clock direction, the lagging axis of the alignment film 17 of the one substrate member 14 which is parallel to the direction of movement 7 is a direction of 85 degrees from the 6-o'clock direction in the counter-clockwise direction, and the lagging axis of the alignment film 22 of the other substrate member 19 is a direction of 85 degrees from the 9-o'clock direction in the counter-clockwise direction.

Figure 5:
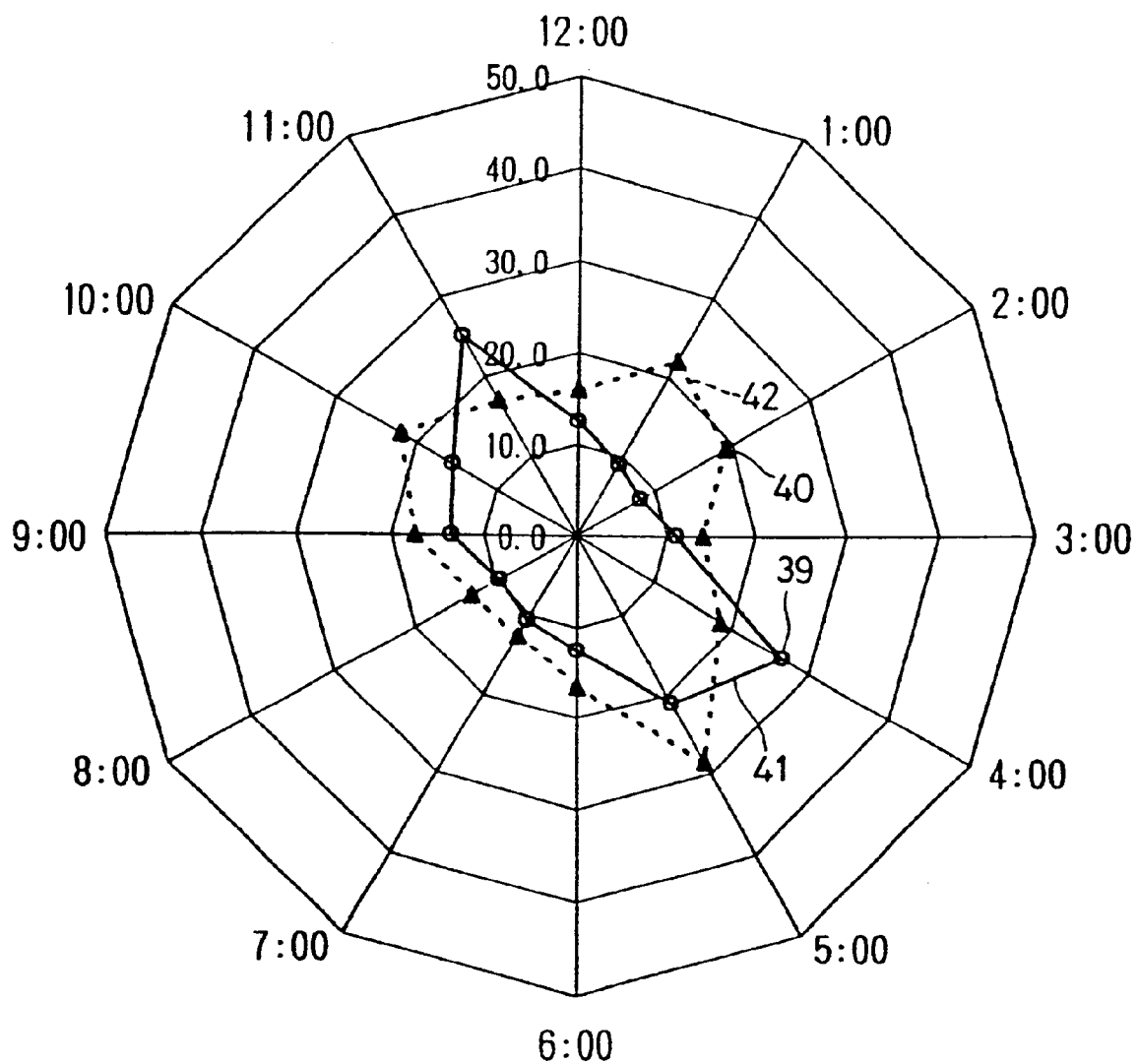
FIG. 5 is an iso-contrast graph which provides a contrast Co=10 of a liquid crystal display device which is fabricated by method of forming an alignment film according to an embodiment of the invention.

FIG. 5 is an iso-contrast graph plotting points at which the contrast Co=10 is obtained in liquid crystal display device which is fabricated by the methods of forming an alignment film according to the embodiments. The direction of the shorter edges of a display screen is the 12–6 o'clock direction and the longitudinal direction of the display screen is the 9–3 o'clock direction. The center point of the iso-contrast graph is considered as 0 degrees which is upright to the display screen, to show a range of inclinations of the viewing angle from 0 to 50 degrees. The viewing angle is measured by measuring an inclination of the viewing angle when the contrast Co=10 is obtained in a direction ranging from the 1-o'clock direction to the 12-o'clock direction while shifting the direction by one hour.

The viewing angle characteristic of the liquid crystal display device 8 is expressed by means of white circles 39 representing the measurement points and a solid line 41 connecting the white circles 39. It is known that the liquid crystal display device which is fabricated by the manufacturing steps which include the methods of forming an alignment film according to the conventional techniques has an excellent viewing angle characteristic in the 12–6 o'clock direction. In contrast, the viewing angle characteristic of the liquid crystal display device 8 which is obtained by the methods of forming an alignment film according to the embodiments is excellent in the directions which are a little off the 12–6 o'clock direction. However, such a deviation in the viewing angle characteristic does not create any practical problem since a user's viewing angle direction is generally in front of the display screen.

Figure 6:
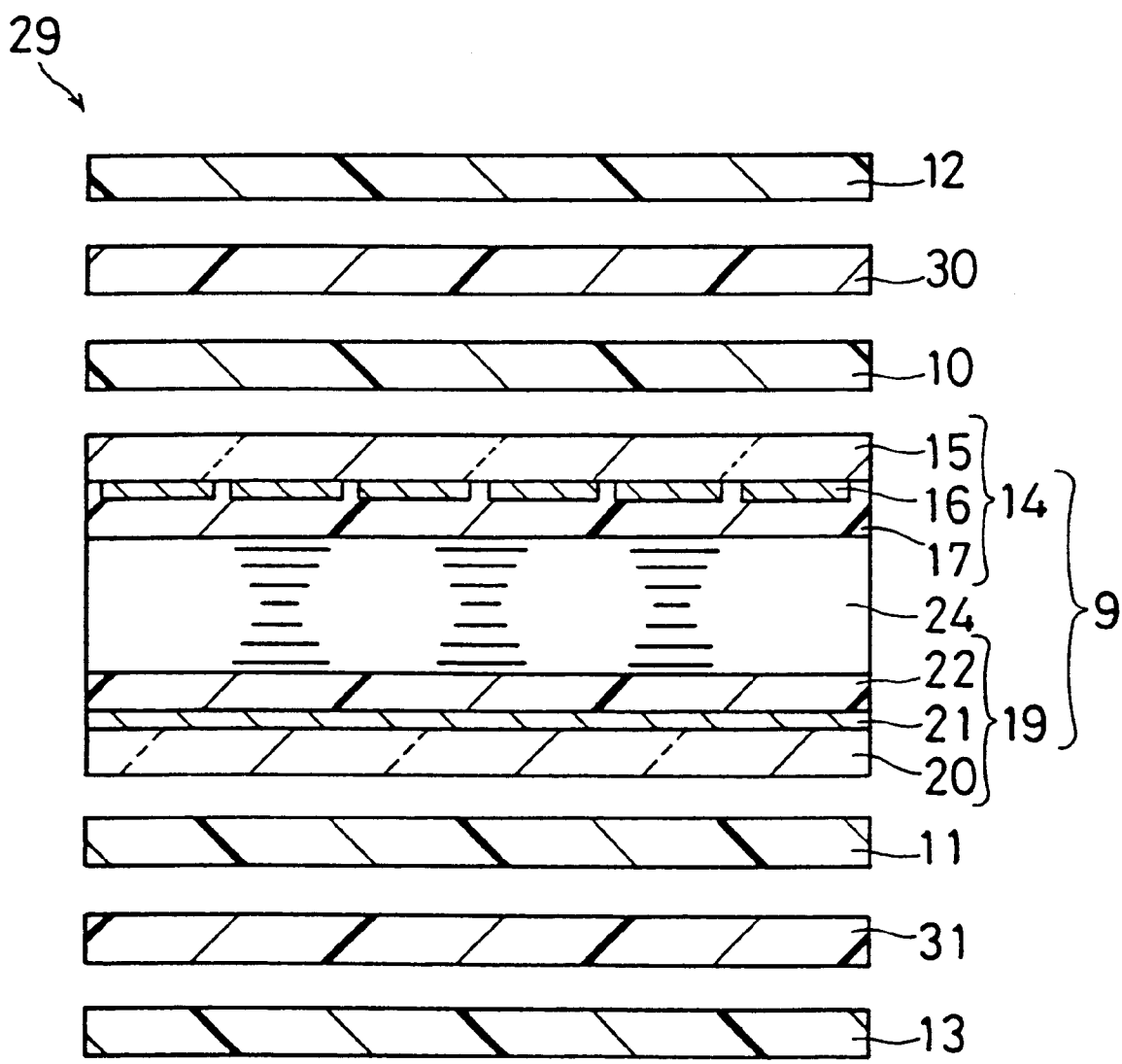
FIG. 6 is an exploded cross sectional view showing a liquid crystal display device 29 which is fabricated using a manufacturing method including the method of forming an alignment film according to the invention.

Now, a description will be given on a case where a liquid crystal display device further comprises optical compensators 30 and 31 in order to improve the deviation in the viewing angle characteristic and further enhance the visibility. FIG. 6 is an exploded cross sectional view showing a liquid crystal display device 29 which is fabricated using by the methods of forming the alignment film. The liquid crystal display device 29 is different from the liquid crystal display device 8 shown in FIG. 2 only in that the optical compensators 30 and 31 are inserted, but is otherwise the same as the liquid crystal display device 8. Further, the method of forming the one substrate member 14 and the other substrate member 19 of the liquid crystal display device 29 is the same as the method of forming an alignment film of the liquid crystal display device which was used to study the viewing angle characteristic. Structural components which are the same as those of the liquid crystal display device 8 will be referred to by the same reference symbols and a detailed description will be simply omitted.

The optical compensators 30 and 31 are realized by films which are stacked with liquid crystal macromolecules aligned vertically, and disposed respectively between the phase contrast plates 10, 11 and the polarization plates 12, 13. Further, with respect to the optical compensators 30 and 31, at least one optical compensator may be disposed between the liquid crystal display element 9 and the polarization plates 12, 13. The range of the viewing angle of the liquid crystal display device 29 is expanded as the optical compensators 30 and 31 are disposed.

The range of the viewing angle in which the contrast Co=10 is obtained was measured to evaluate the viewing angle characteristic of the liquid crystal display device 29, which is shown in FIG. 5. In FIG. 5, the viewing angle characteristic of the liquid crystal display device 29 is indicated by means of black triangles 40 representing the measurement points and a dotted line 42 connecting the black triangles 40. The graph shows that the range of the viewing angle of the liquid crystal display device 29 is expanded more in the 12–6 o'clock direction than in the liquid crystal display device whose viewing angle characteristic is indicated at the white circles. Thus, it is found that by inserting the optical compensators 30 and 31, the deviation in the viewing angle direction is corrected and the visibility is improved, as compared with the viewing angle characteristic which is indicated at the solid line 41.

Figure 7A:
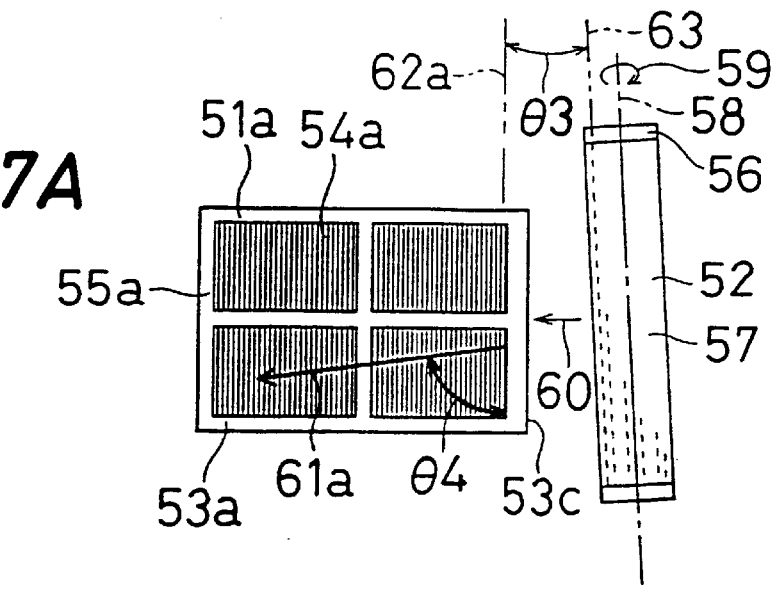
FIGS. 7A and 7B are plan views showing a rubbing treatment apparatus according to a third embodiment of the invention.
Figure 7B:
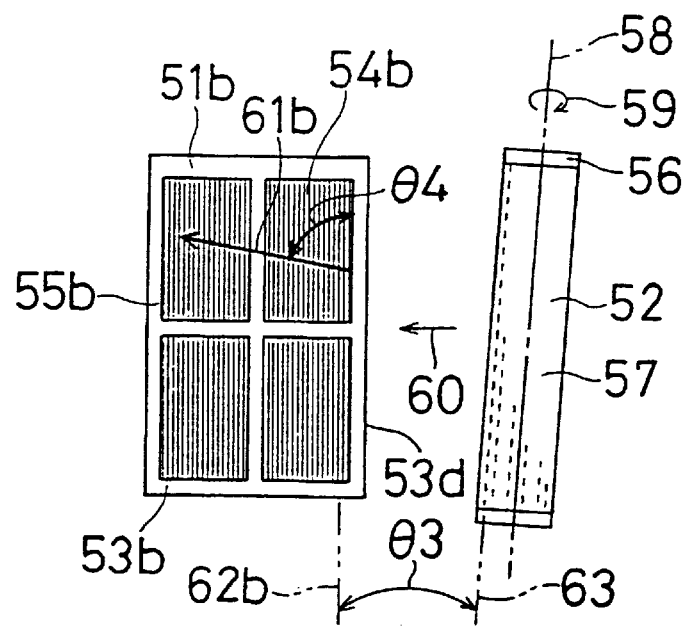

FIGS. 7A and 7B are plan views showing a rubbing treatment apparatus according to a third embodiment of the invention. Here, a description will be given on an example in which the pair of substrate members of a liquid crystal display device is formed using the rubbing treatment apparatus. FIG. 7A shows a condition of the rubbing treatment upon a substrate-to-be-processed 51a which becomes one of the pair of substrate members, while FIG. 7B shows a state of rubbing treatment upon a substrate-to-be-processed 51b which becomes the other one of the substrate members.

In the substrate 51a, a display electrode 54a is formed on one surface of a substrate 53a, and a film-to-be-treated 55a of a resin such as polyimide is formed covering the display electrode 54a. Now, a description will be given on rubbing treatment in a case where a surface of the substrate 51a has a step due to the display electrode 54a. A rubbing roller 52 is formed by winding a rubbing cloth 57 around a surface of a roller 56 using a double-coated adhesive tape or the like.

More precisely, the rubbing roller 52 is brought into a contact with a surface of the film-to-be-treated 55a under a constant pressure, and while rotating the rubbing roller 52 about a rotation axis 58 in a predetermined direction 59 at a constant speed, the substrate 51a and the rubbing roller 52 are moved relative to each other, for instance, the rubbing roller 52 is moved in a direction 60, so that the surface of the film-to-be-treated 55a is rubbed in a predetermined direction, whereby an alignment film is obtained.

Similar to the substrate 51a, in the substrate 51b, a display electrode 54b is formed on one surface of a substrate 53b, and a film-to-be-treated 55b is formed covering the display electrode 54b. An alignment film is obtained by rubbing a surface of the film-to-be-treated 55b in a manner similar to that described above.

Figure 15A:
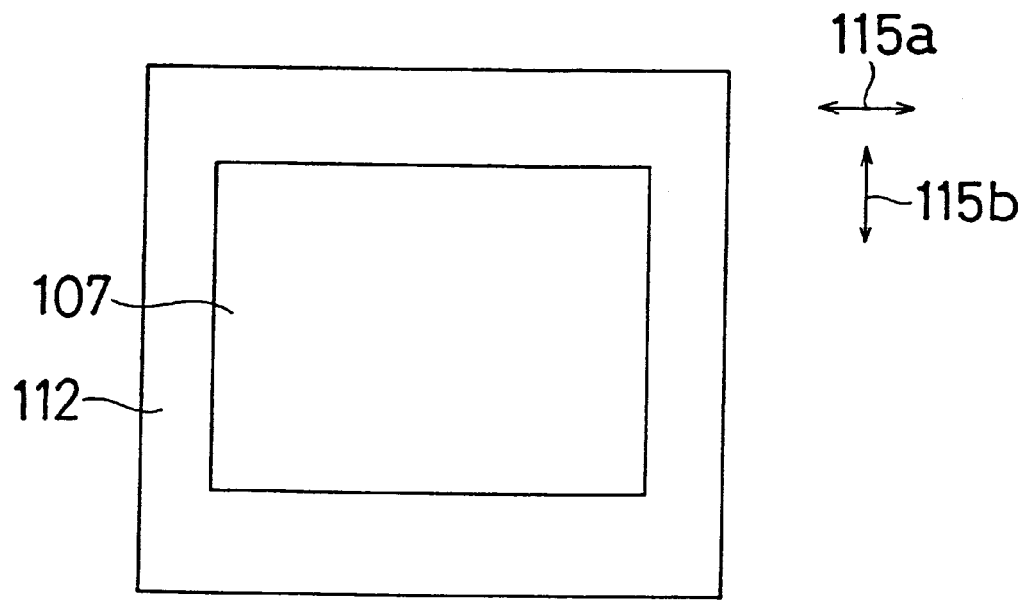
FIG. 15A is a plan view showing a fabric 112 for a rubbing cloth 107.
Figure 15B:
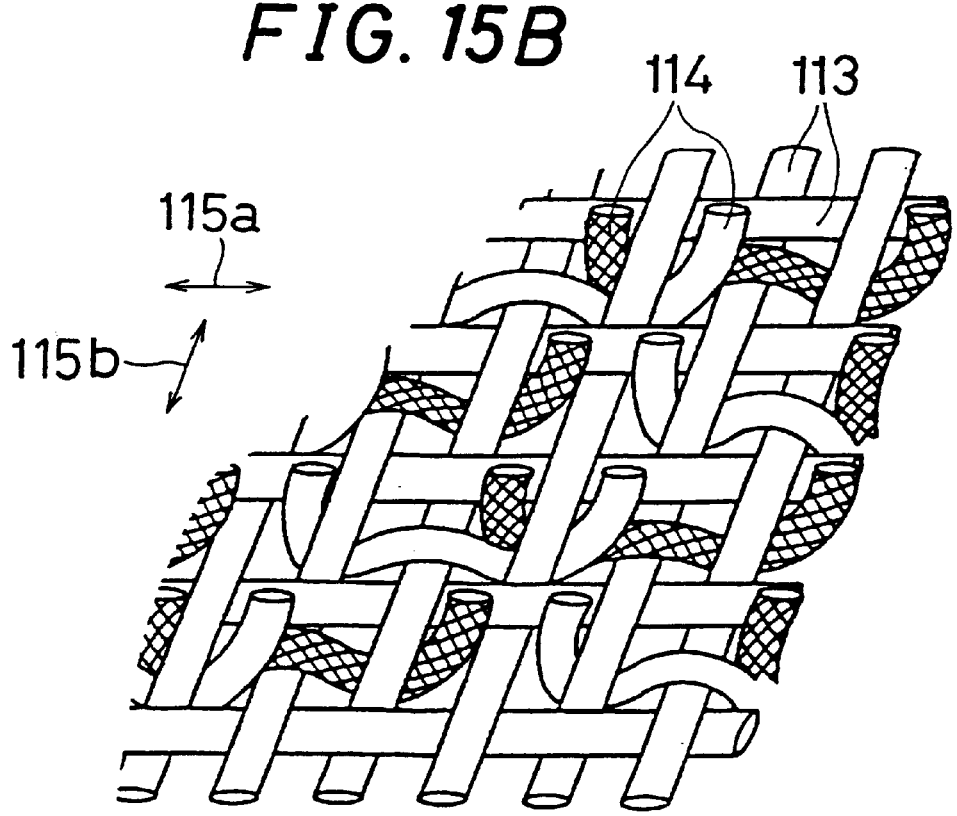
FIG. 15B is a perspective view expanding the fabric 112.
Figure 16A:
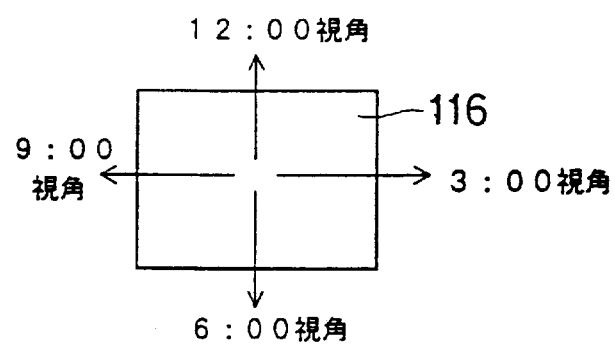
FIGS. 16A to 16D are plan views for describing a liquid crystal display device 116 of the STN type which comprises an alignment film which is formed using the conventional rubbing treatment apparatus.
Figure 16B:
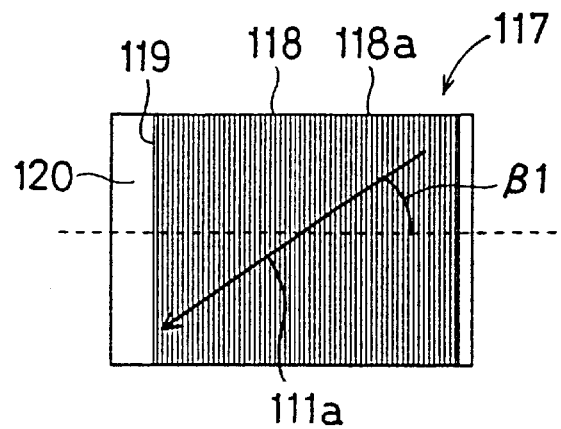
Figure 16C:
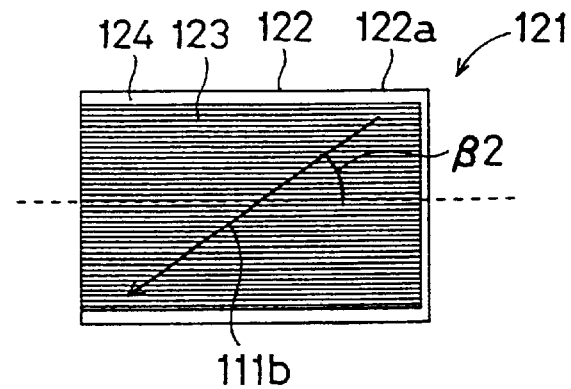
Figure 16D:
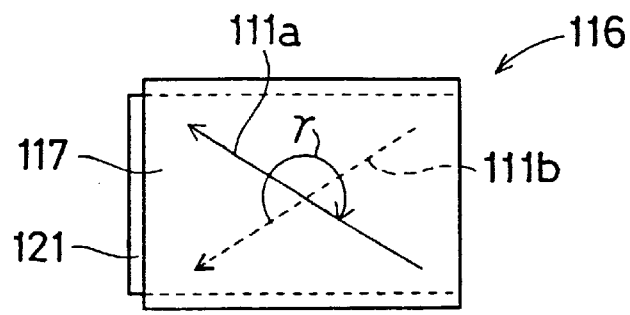
Figure 17:
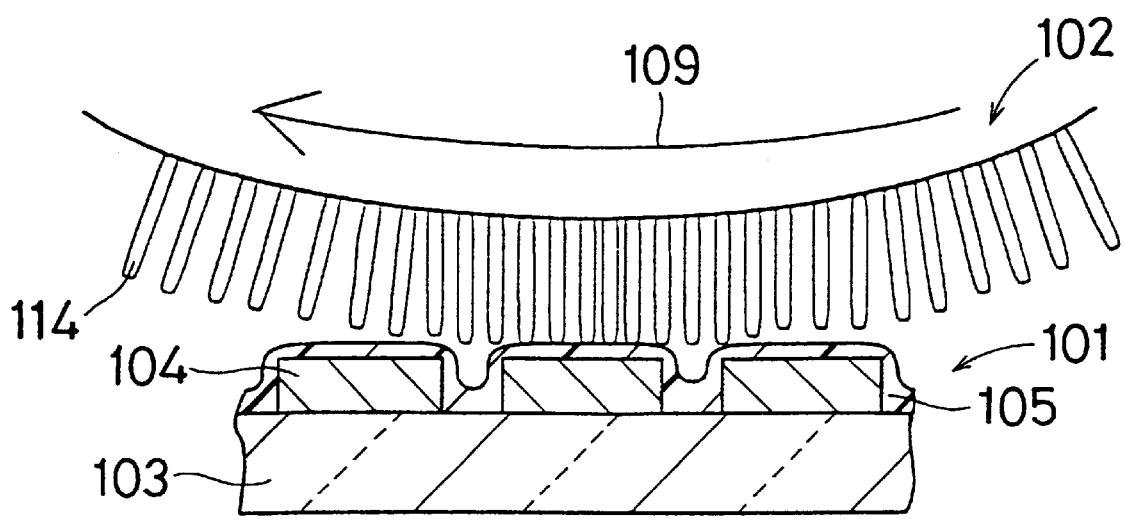
FIG. 17 is an enlarged cross sectional view of a state of rubbing treatment.
Figure 18A:
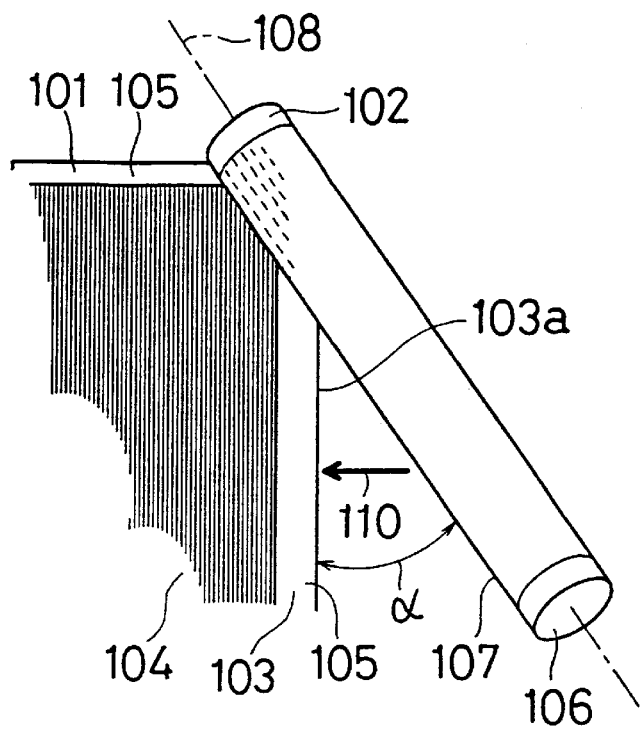
FIGS. 18A and 18B are enlarged diagrams of a state of rubbing treatment of the conventional technique, and more precisely.
Figure 18B:
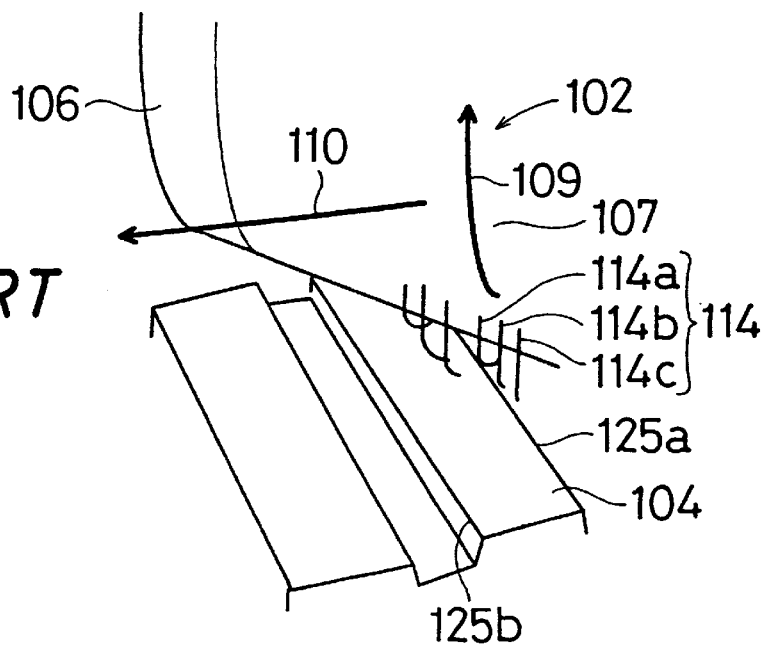

For a liquid crystal display device which is to provide a dot matrix display, the following conditions are selected. The substrates 53a and 53b are rectangle. The display electrodes 54a and 54b are strip-shaped, and a longitudinal direction 62a of the display electrode 54a is parallel to one edge 53c of the substrate 53a while a longitudinal direction 62b of the display electrode 54b is parallel to one edge 53d of the substrate 53b. The rubbing treatment is started at the edges 53c and 53d. The rubbing cloth 57 of the rubbing roller 52 is a cloth implanting pile yarns similar to the conventional techniques as shown in FIG. 15B, and one of implanting directions 63 of the pile yarns is parallel to the rotation axis 58.

Further, during the rubbing treatment of the substrate 51a, an angle between the one implanting direction 63 of implanting the pile yarns and the longitudinal direction 62a of the strip-shaped display electrode 54a of the substrate 51a is selected as a predetermined angle θ3, based on the longitudinal direction 62a of the strip-shaped display electrode 54a. In this embodiment, the angle θ3 was selected as +5 degrees with the clockwise direction as a positive direction in FIGS. 7A and 7B. During the rubbing treatment of the substrate 51b, an angle between the one implanting direction 63 and the longitudinal direction 62b of the strip-shaped display electrode 54b of the substrate 51b is selected as the predetermined angle θ3, based on the longitudinal direction 62b of the strip-shaped display electrode 54b. In this embodiment, the angle θ3 was selected as −5 degrees. Preferably, the angle θ3 is selected as 5 degrees or smaller.

A direction which is perpendicular to the one implanting direction 63 of implanting the pile yarns of the rubbing roller 52 is rubbing directions 61a and 61b. Here, the direction is perpendicular to the rotation axis 58.

In this embodiment, an angle between the rubbing direction 61a, which is perpendicular to the one implanting direction 63, and the longitudinal direction 62a of the strip-shaped display electrode 54a and an angle between the rubbing direction 61b, which is perpendicular to the one implanting direction 63, and the longitudinal direction 62b of the strip-shaped display electrode 54b are both selected as a predetermined angle θ4. The angle θ4 is preferably selected in the range between 10 and 60 degrees.

In this embodiment, a cloth of a rayon fiber, which is commercially available as a product named YA-18R from Yoshikawa Chemical Industry, was used as the rubbing cloth 57. Further, rubbing treatment was performed for fabricating a liquid crystal display device in which the direction with the highest contrast ratio was the direction of a viewing angle of 10 o'clock 30 minutes. In addition, film thicknesses of the display electrodes 54a and 54b were 3,000 Å, and the size of a display screen was 13.8 type with diagonal lines of 35 cm.

Figure 8:
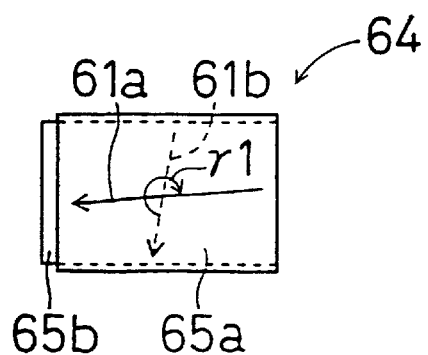
FIG. 8 is a plan view for describing a liquid crystal display device 64 of the STN type which comprises a pair of substrate members 65a, 65b in which alignment films are formed using the rubbing treatment apparatus of the third embodiment.

FIG. 8 is a plan view for describing a liquid crystal display device 64 of the STN type which comprises a pair of substrate members 65a, 65b in which alignment films which are formed using a rubbing treatment apparatus as described above. The alignment films are faced with each other in such a manner that the rubbing directions 61a and 61b are at an angle γ1, and adhered to each other with a liquid crystal interposed between the substrate members 65a and 65b, thereby completing the liquid crystal display device 64. The angle γ1 is selected as 180 degrees or larger, and preferably selected in the range of 210 to 260 degrees. In this embodiment, the angle γ1 is selected as 260 degrees. The angle γ1 is twist angles of liquid crystal molecules which are interposed between the substrate members 65a and 65b.

Further, the liquid crystal display device of this embodiment was a color liquid crystal display device of the STN type in which a cell thickness, which is a space between the substrate members 65a and 65b, was 6 μm. After injecting the liquid crystal, the device was combined with phase contrast plates, polarization plates, etc.

Figure 14:
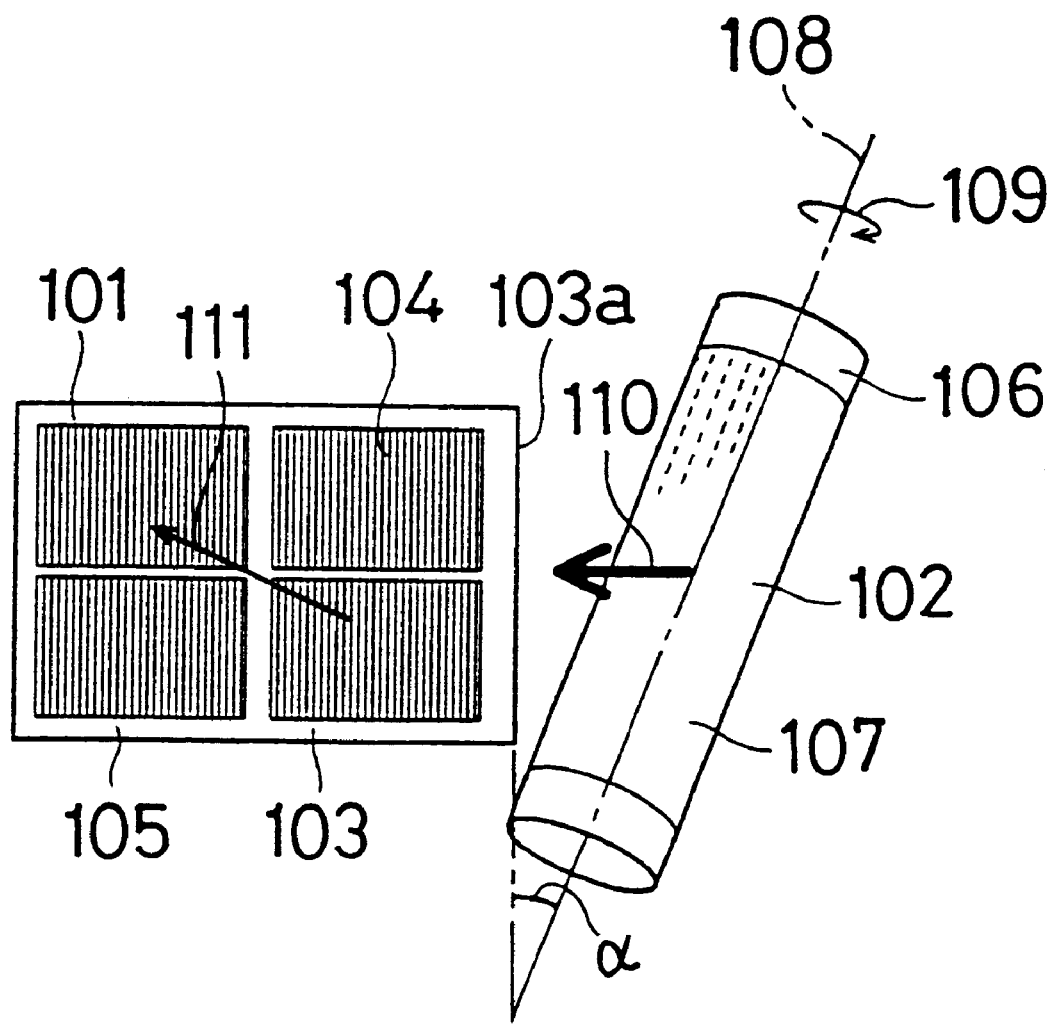
FIG. 14 is a plan view showing a substrate-to-be-processed 101 and a rubbing roller 102, describing rubbing treatment using a rubbing treatment apparatus according to a conventional technique.

Now, a description will be given on results of comparison between a display quality of the liquid crystal display device of the third embodiment and a display quality of a liquid crystal display device of other conventional technique. The liquid crystal display device of the other conventional technique comprises alignment films which are formed using a rubbing treatment apparatus as that shown in FIG. 14. The direction with the highest contrast ratio was the 12-o'clock viewing angle direction, the twist angle was 260 degrees, and the cell thickness was 6 μm. This will be referred to as a third example for comparison. The display qualities were evaluated by observing the liquid crystal display devices with a microscope while keeping the devices turned on. It was confirmed that as compared with the liquid crystal display device of the third example for comparison, drop-off is smaller in a peripheral portion of pixels in the 12-o'clock direction and a peripheral portion of pixels in the 6-o'clock direction, and the device is lit up at a high uniformity within a screen.

In addition, electro-optical characteristics were evaluated using a predetermined drive circuit connected. That is, using a luminance measurement apparatus BM7 which is available from Topcom, luminances were measured while supplying an ON-signal (turn on) and an OFF-signal (turn off) to the liquid crystal display device, and contrast ratios in the upright direction with respect to the display screen were calculated from luminance ratios. While the contrast ratio was 29.5:1 in the liquid crystal display device of the third example for comparison, the contrast ration was 37:1 in the liquid crystal display device of the third embodiment. This is an increase of about 25% in the contrast ratio.

Further, transmission rates of back light to the liquid crystal display devices were calculated. While the transmission rate was 3.4% in the liquid crystal display device of the third example for comparison, the transmission rate was 4.5% in the liquid crystal display device of the third embodiment. This is an increase of about 30% in the transmission rate.

Figure 9A:
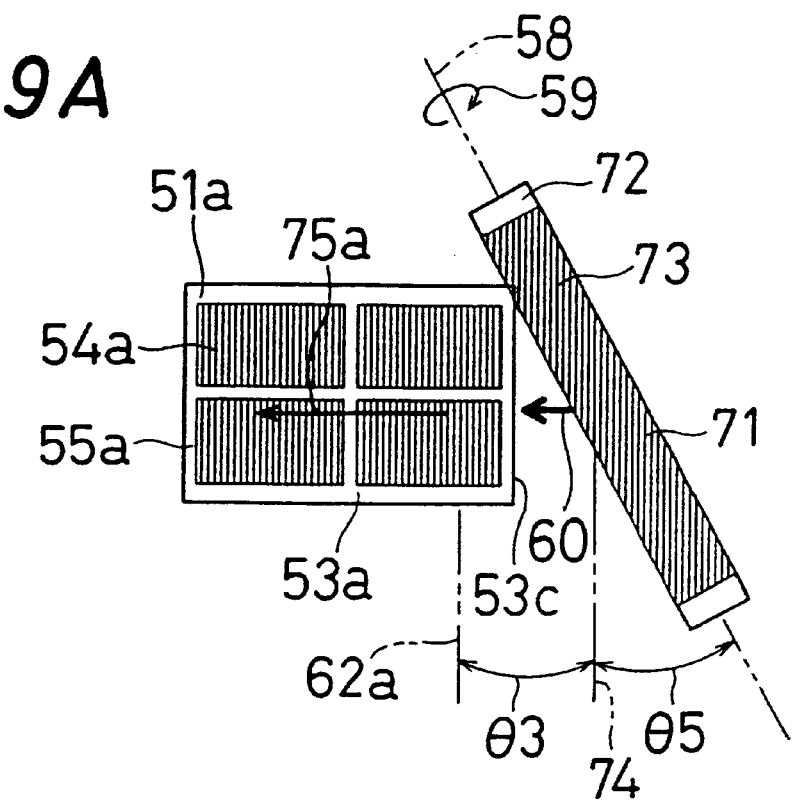
FIGS. 9A and 9B are plan views showing a rubbing treatment apparatus according to a fourth embodiment of the invention.
Figure 9B:
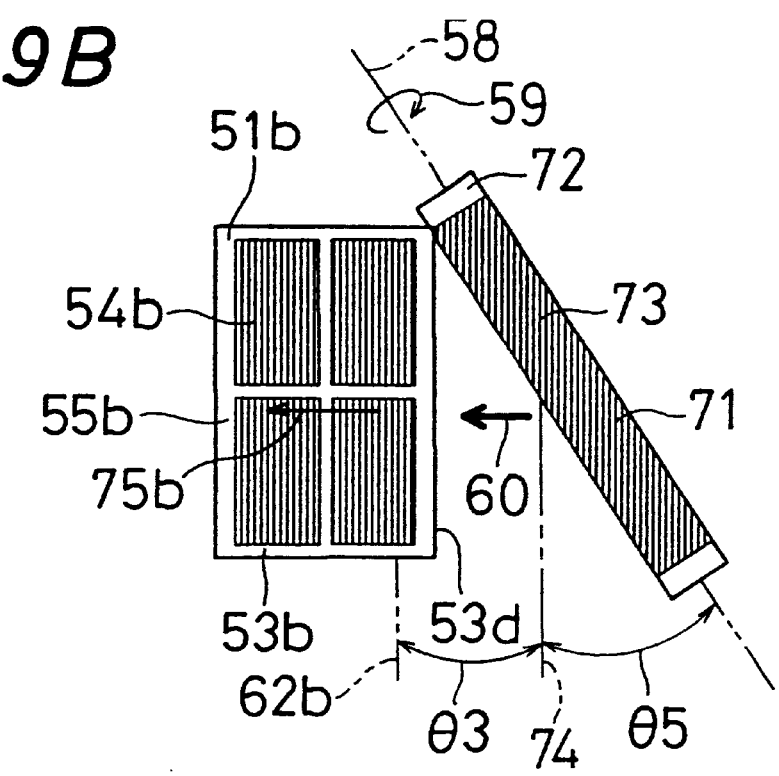

FIGS. 9A and 9B are plan views showing a rubbing treatment apparatus according to a fourth embodiment of the invention. FIG. 9A shows a condition of the rubbing treatment upon the substrate-to-be-processed 51a, while FIG. 9B shows a condition of the rubbing treatment upon the substrate-to-be-processed 51b. A rubbing roller 71 which is used in the fourth embodiment is obtained by winding a rubbing cloth 73 around a surface of a roller 72 using a double-coated adhesive tape or the like. As in the third embodiment, the rubbing roller 71 is brought into a contact with surfaces of the films-to-be-processed 55a and 55b under a constant pressure, and while rotating the rubbing roller 71 about the rotation axis 58 in the predetermined direction 59 at a constant speed, the substrates 51a and 51b and the rubbing roller 71 are moved relative to each other, for instance, the rubbing roller 71 is moved in the direction 60, so that the surfaces of the films-to-be-processed 55a and 55b are rubbed in a predetermined direction, whereby alignment films are obtained.

For a liquid crystal display device which is to provide a dot matrix display, the following conditions are selected. The shapes of the substrates 53a and 53b, the shapes of the display electrodes 54a and 54b and the positional relationships of formation are the same as in the third embodiment. In the fourth embodiment as well, the surfaces of the films-to-be-processed 51a and 51b include steps due to the display electrodes 54a and 54b. The rubbing cloth 73 of the rubbing roller 71 is a cloth implanting pile yarns similar to the conventional techniques as shown in FIG. 15B, and an angle between one of implanting directions 74 of the pile yarns and the rotation axis 58 is selected as a predetermined angle $\theta 5$. The angle $\theta 5$ is preferably selected in the range between 10 and 60 degrees.

During the rubbing treatment of the substrate 51a, an angle between the one implanting direction 74 of implanting the pile yarns and the longitudinal direction 62a of the strip-shaped display electrode 54a of the substrate 51a is selected as the predetermined angle $\theta 3$. During the rubbing treatment of the substrate 51b, an angle between the one implanting direction 74 and the longitudinal direction 62b of the strip-shaped display electrode 54b of the substrate 51b is selected as the predetermined angle $\theta 3$. The angle $\theta 3$ is selected in the range of ±5 degrees. In this embodiment, the angle $\theta 3$ was 5 degrees.

Further, an angle between the rotation axis 58 of the rubbing roller 71 and the edge 53c of the substrate 53a and an angle between the rotation axis 58 and the edge 53d of the substrate 53b are selected as a predetermined angle. In this embodiment, 40 degrees was selected as the angle.

A direction which is perpendicular to the one implanting direction 74 of implanting the pile yarns of the rubbing roller 71 is rubbing directions 75a and 75b. For instance, the direction is parallel to the direction of movement 60.

In this embodiment, a product named YA-19R from Yoshikawa Chemical Industry was used as the rubbing cloth 73. Further, rubbing treatment was performed for fabricating a liquid crystal display device in which the direction with the highest contrast ratio was the 12-o'clock viewing angle direction. In addition, films thicknesses of the display electrodes 54a and 54b were 3,000 Å, and the size of a display screen was 13.8 type with diagonal lines of 35 cm.

It is possible to realize the liquid crystal display device 64 of the STN type as that shown in FIG. 8, by forming the pair of substrate members 65a and 65b using the rubbing treatment apparatus according to the fourth embodiment. In this embodiment, a liquid crystal display device was fabricated with the angle $\gamma 1$ selected as 260 degrees and the cell thickness as 6.7 $\mu$m.

A torque current for driving the rubbing roller 71 of the rubbing treatment apparatus according to the fourth embodiment was smaller and more stable than in the liquid crystal display device of the other conventional technique. This is considered to be because since the angles $\theta 3$ between the one implanting direction 74 of implanting the pile yarns of the rubbing roller 71 and the longitudinal directions 62a and 62b of the strip-shaped display electrodes 54a and 54b of the semifinished substrate members 51a and 51b are selected to be in the range of ±5 degrees, the edges of the pile bristles contact and leave the edges of the electrodes 54a and 54b approximately at the same time, which reduces the irregularity of the edges of the pile bristles. Such an effect is also obtained in the rubbing treatment apparatus according to the third embodiment.

Next, a description will be given on results of comparison between a display quality of the liquid crystal display device of the fourth embodiment and a display quality of a liquid crystal display device of a further conventional technique. The liquid crystal display device of the further conventional technique is the same as the liquid crystal display device of the third example for comparison which has been described in relation to the third embodiment. The display qualities were evaluated in a similar manner to that in the third embodiment. It was confirmed that like the liquid crystal display device of the third embodiment, as compared with the liquid crystal display device of the third example for comparison, drop-off is smaller in a peripheral portion of pixels in the 12-o'clock direction and a peripheral portion of pixels in the 6-o'clock direction, and the device is lit up at a high uniformity within a screen.

In addition, electro-optical characteristics were evaluated as in the third embodiment. Regarding contrast ratios in the upright direction with respect to the display screen, the contrast ratio was 33.7:1 in the liquid crystal display device of the third example for comparison, while the contrast ration was 38.4:1 in the liquid crystal display device of the fourth embodiment. This is an increase of about 14% in the contrast ratio.

Further, transmission rates of back light to the liquid crystal display devices were calculated. While the transmission rate was 3.8% in the liquid crystal display device of the third example for comparison, the transmission rate was 4.3% in the liquid crystal display device of the fourth embodiment. This is an increase of about 13% in the transmission rate.

Figure 10:
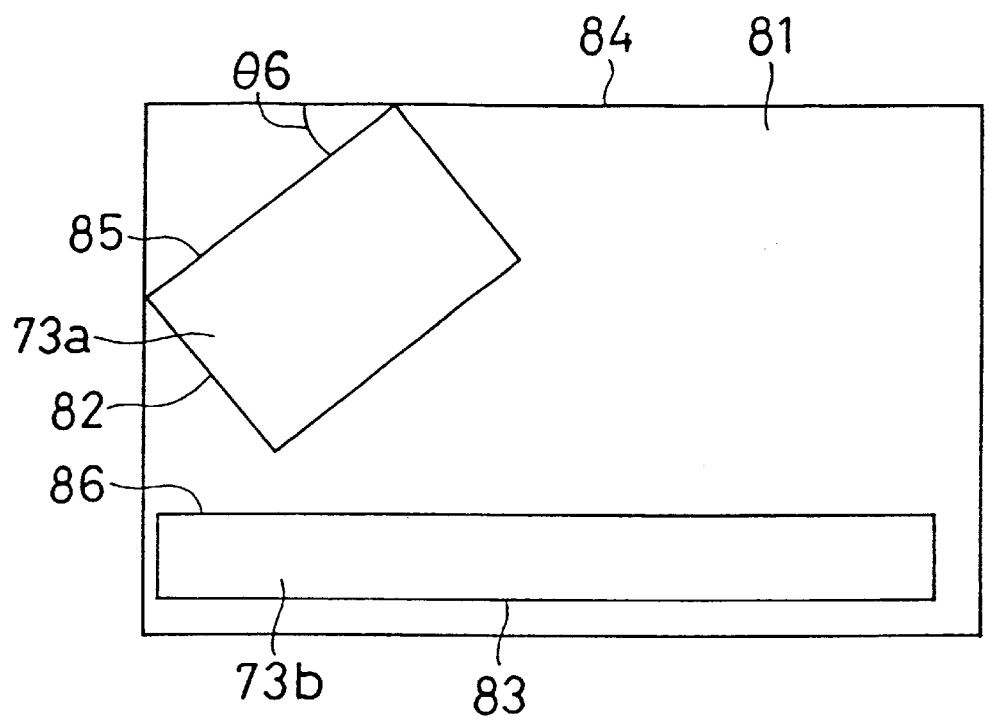
FIG. 10 is a plan view showing a fabric 81 whose predetermined region is cut as a rubbing cloth 73 for a rubbing roller 71.
Figure 11A:
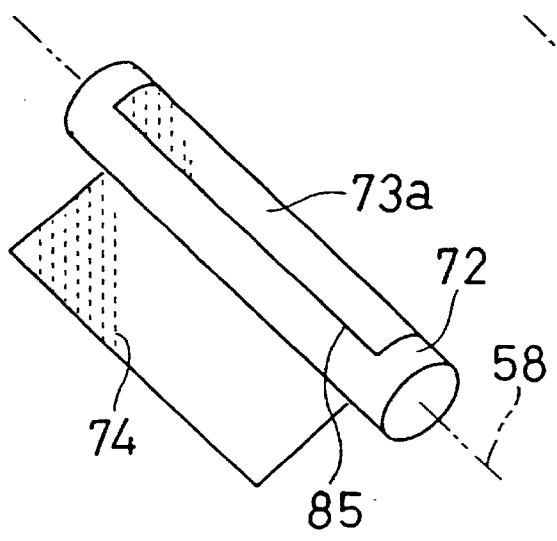
FIGS. 11A and 11B are perspective views showing a condition in which rubbing cloths 73a, 73b which are cut are wound and adhered around a roller 72.
Figure 11B:
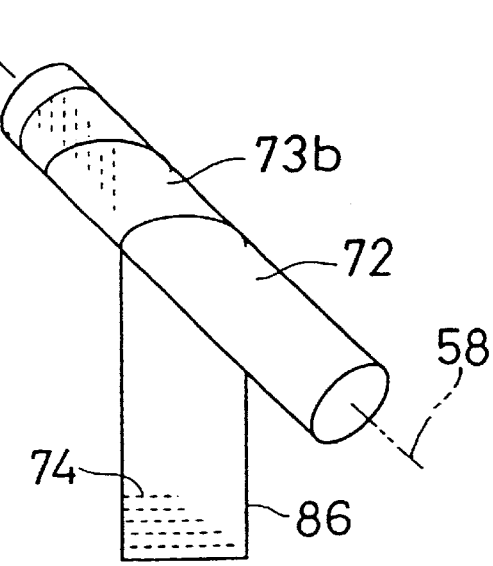

FIG. 10 is a plan view showing a fabric 81 whose predetermined region is cut as the rubbing cloth 73a for the rubbing roller 71 (as shown in FIGS. 9A and 9B). FIGS. 11A and 11B are perspective views showing a condition in which the cut rubbing cloth is wound around the roller 72.

The fabric 81 for the rubbing cloth is similar to the fabric in the rubbing apparatus of the further conventional technique. Specifically, as shown in FIG. 15B, the fabric 81 is a cloth in which the pile yarns 114, which are bundles of several tens of filaments, are woven with foundation yarns 113 which are woven to extend laterally and vertically in such a manner that the implanting lengths of the pile yarns 114 are uniform. In short, the fabric 81 is a cloth in which the pile yarns 114 are implanted at cyclic intervals from each other which are periodical in two directions which are perpendicular to each other.

The cut area at which the fabric 81 is set can be set in two manners. In one manner, the cut area is set in such a manner that one edge 84 of the fabric 81 which is parallel to the one implanting direction of implanting the pile yarns forms a predetermined angle θ6 with one edge 85 of a rectangular cut area 82. That is, the area 82 is cut out in which the edge 85 has the angle θ6 with respect to the one implanting direction of implanting the pile yarns. In this case, the angle θ6 is preferably selected to be in the range between 10 and 60 degrees. In the fourth embodiment, 45 degrees is selected as the angle θ6. A rubbing cloth 73a which is obtained by cutting out the area 82 is wound around the roller 72 in such a manner that the edge 85 is parallel to the rotation axis 58 as shown in FIG. 11A. In other words, the edge 85 of the rubbing cloth 73a is wound around so as to coincide with a width direction of the roller 72.

In the other manner, with the angle θ6 set as 0 degrees, the cut area is set so that the one edge 84 of the fabric 81 is parallel to one edge 86 along the longitudinal direction of a strip-shaped rectangular cut area 83. That is, the area 83 is cut out which has the edge 86 which is parallel to the one implanting direction. A rubbing cloth 73b which is obtained by cutting out the region 82 is spirally wound around in such a manner that the edge 86 of the rubbing cloth 73b has a slant toward a direction of the rotation axis 58 of the roller 72, as shown in FIG. 11B.

In the third embodiment, the cut area is set with the angle θ6 set as 0 degrees, so that the edge 84 of the fabric 81 is parallel to one edge of the cut area. In short, the area is cut out which has an edge which is parallel to the one implanting direction. In a similar manner to that shown in FIG. 11A, a rubbing cloth which is cut out in this manner are wound around the roller 56. By cutting the fabric 81 in the direction which is parallel to the one implanting direction or in the direction which is perpendicular to the one implanting direction, it is possible to increase the efficiency of use of the fabric 81.

Figure 12A:
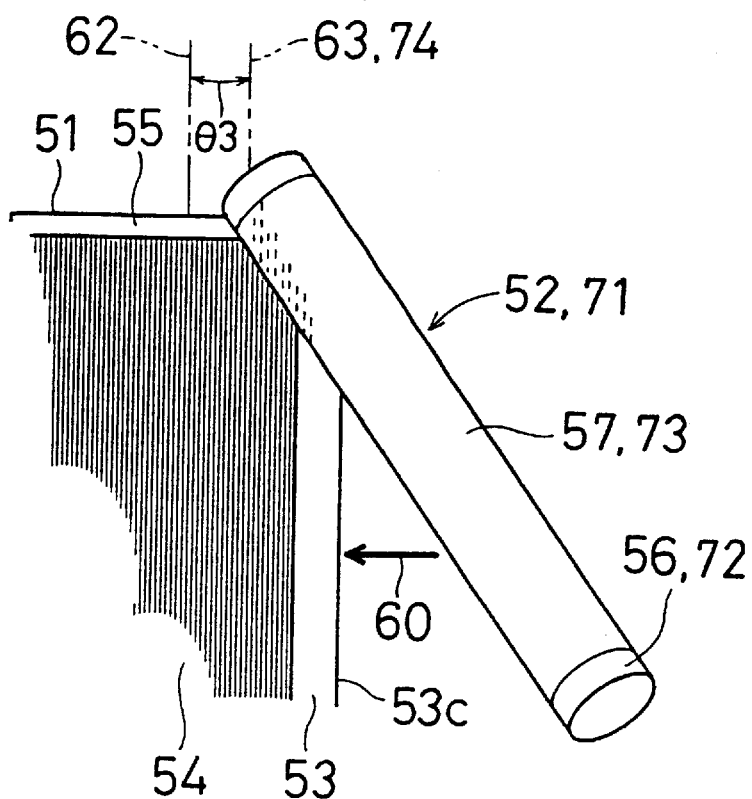
FIGS. 12A and 12B are enlarged diagrams of states of rubbing treatments in the third and fourth embodiments, and more precisely.
Figure 12B:
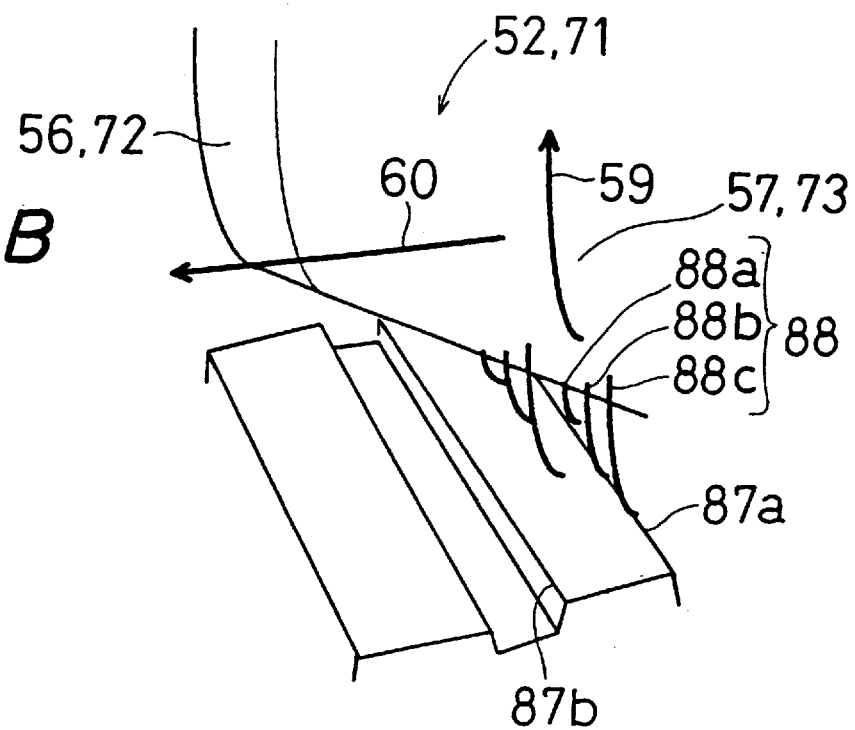
Figure 13:
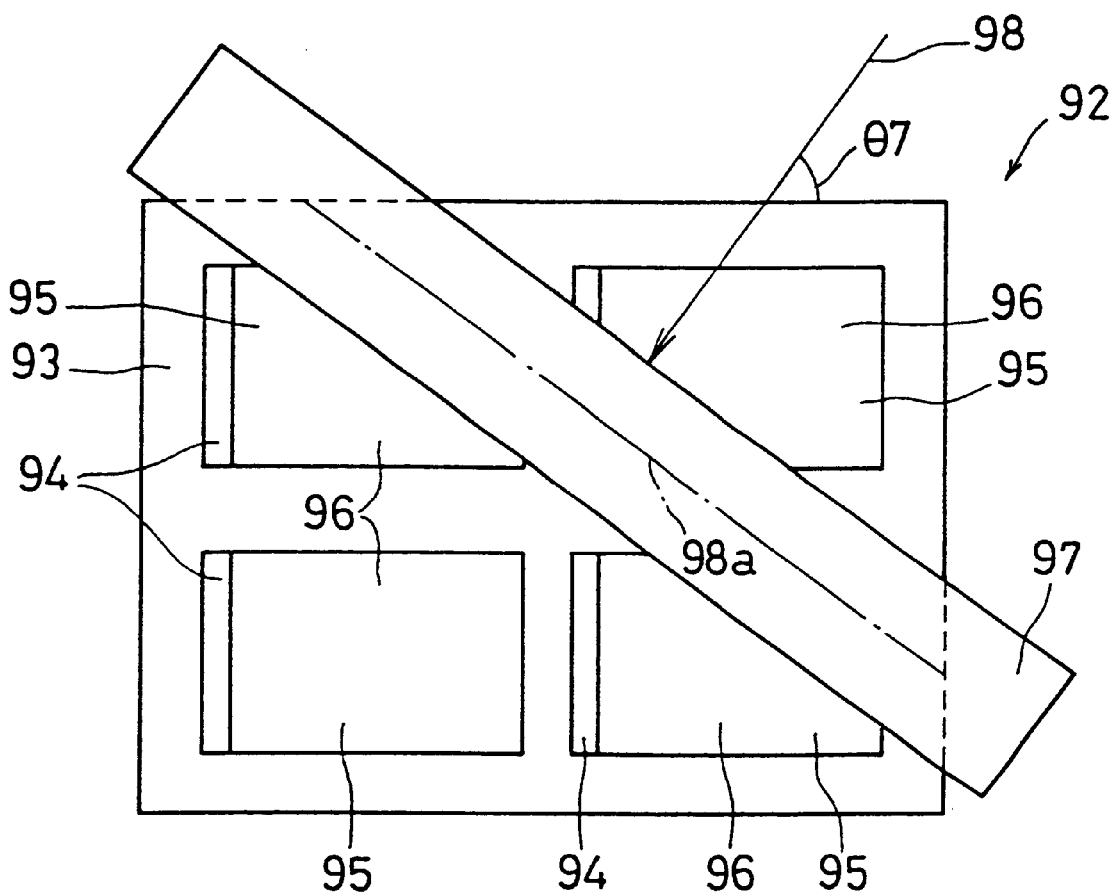
FIG. 13 is a plan view of a substrate member 92, describing a conventional rubbing method.

FIGS. 12A and 12B are enlarged views of states of rubbing treatments in the third and the fourth embodiments. More precisely, FIG. 12A is a plan view and FIG. 12B is a perspective view. Although a step is formed in a surface of a semifinished substrate member 51 due to the electrodes 54, since the substrate 53 is rectangular, the longitudinal direction 62 of the strip-shaped electrodes 54 is parallel to the edge 53c of the substrate 53, and the angles θ3 are selected in the range of ±5 degrees between the implanting directions 63 and 74 of implanting the pile yarns of the rubbing rollers 52 and 71 and the longitudinal direction 62 of the strip-shaped electrodes 54, during the rubbing treatment, as shown in FIG. 12B, pile yarns 88a, 88b and 88c contact one edge 87a of a convex portion which forms the step approximately at the same time. Further, the pile yarns 88a, 88b and 88c leave an edge 87b which is opposite to the edge 87a approximately at the same time.

This reduces a disturbance to the edges of bristles of the pile yarns 88, regardless of whether the step is large or small. Accordingly, in the surfaces of the electrodes 54, suppresses a disturbance in rubbing direction among a center portion, a peripheral portion of the side where the rubbing treatment is started and a peripheral portion of the side where the rubbing treatment ends thereof.

In a liquid crystal display device which comprises alignment films which are rubbed in such a fashion, liquid crystal molecules are aligned with an improved uniformity within a pixel region, and the uniformity of the twist angles γ1 is improved. Moreover, the pre-tilt angles in the peripheral portion of pixels in the 12-o'clock direction and the peripheral portion of the pixels in the 6-o'clock direction become almost the same as the pre-tilt angle in the central portion of the pixels, and the drop-off phenomena that a transmission rate locally increases is suppressed. In addition, since the uniformity of the pre-tilt angles within the screen is enhanced, a difference between the pre-tilt angle with an ON-voltage applied and the pre-tilt angle with an OFF-voltage applied does not decrease, so that it is possible to maintain a high contrast ratio. Further, since a sufficient luminance is obtained without increasing the luminance of back light when the OFF-voltage is to be reduced, it is possible to realize a liquid crystal display device which uses a small consumption power and is driven successively for long hours. Still further, in a liquid crystal display device of the STN type whose display quality is susceptible to an influence of the condition of alignment of a liquid crystal, it is possible to obtain an excellent display quality.

As described above, in the third and the fourth embodiments, since the angle θ3 is selected to be in the range of ±5 degrees, disturbance to the edges of bristles of pile yarns is reduced and an in-screen uniformity of a rubbing direction is improved. Any one of a pair of substrate members of a liquid crystal display device can be rubbed under the conditions described above, to thereby improve the uniformity.

In the third embodiment, since the angle θ4 is selected to be in the range of 10 to 60 degrees, it is possible to form substrate members for a liquid crystal display device of the STN type which creates the effects described above.

In addition, in the fourth preferred embodiment, it is possible to form substrate members for a liquid crystal device of the STN type by setting the angle θ5 in the range of 10 to 60 degrees.

In the fourth embodiment, it is possible to form the rubbing roller 71 by winding the rubbing cloth 73a which is cut with the angle θ6 set in the range of 10 to 60 degrees around the roller 72. By winding the rubbing cloth 73a in such a manner that the edge 85 of the rubbing cloth 73a coincides with the direction of the width of the roller 72, a rubbing roller which creates the effects described above is obtained. Further, when the one implanting direction 74 of implanting the pile yarns is set to be parallel to the edge 86 of the rubbing cloth 73b and the rubbing cloth 73b is wound with the edge 86 of the rubbing cloth 73b running spiral at an angle with respect to the rotation axis 58 of the roller 72, it is possible to form a rubbing roller which creates similar effects.

In addition, the scope of the invention also covers the rubbing method in which a plurality strip-shaped electrodes 54 are formed parallel to each other on the substrate 53, the film-to-be-treated 55 which is to be rubbed is formed on the substrate 53 covering the electrodes 54, and the surface of the film-to-be-treated 55 is rubbed using a rubbing treatment apparatus such as the described above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A rubbing treatment apparatus comprising:

a rubbing roller having a rotation axis and including a rubbing cloth wound around a surface thereof to be adhered, the rubbing cloth including pile yarns which are implanted at cyclic intervals in two directions perpendicular to each other, the rubbing roller being for contacting a surface of a film-to-be-processed which is formed so as to cover a plurality of strip-shaped electrodes formed parallel to each other on a substrate, to be moved together with the substrate in relation to each other to thereby perform rubbing treatment on the surface of the film-to-be-treated, wherein the rotation axis of the rubbing roller is parallel to the surface of the film-to-be-treated during the rubbing treatment, wherein an angle $\theta 3$ in a plane parallel to the surface of the film-to-be-treated is formed by one of the implanting directions of the pile yarns of the rubbing roller and the longitudinal direction of the strip-shaped electrodes of the substrate and is selected to be in a range of from +5 degrees to −5 degrees, wherein an angle $\theta 5$ formed by the direction of a rotation axis of the rubbing roller and one of the implanting directions of the pile yarns is selected to be in a range between 10 and 60 degrees.

2. A rubbing cloth which is rectangular and wound around a surface of a roller to be adhered thereto, the rubbing cloth comprising:

pile yarns implanted at cyclic intervals in two directions perpendicular to each other, wherein an angle $\theta 6$ formed by one of implanting directions of the pile yarns and one edge of the rubbing cloth is selected to be in a range between 10 and 60 degrees, wherein the rubbing cloth is wound around the rubbing roller with said one edge of the rubbing cloth parallel to an axis of rotation of the rubbing roller.

3. A rubbing roller having an axis of rotation and comprising:

a rubbing cloth wound around a surface of the rubbing roller, the rubbing cloth including pile yarns which are implanted at cyclic intervals in two directions perpendicular to each other, wherein the rubbing cloth is rectangular, an angle $\theta 6$ formed by one of implanting directions of the pile yarns and respect to one edge of the rubbing cloth is selected to be in a range between 10 and 60 degrees, and the edge of the rubbing cloth is wound parallel to the direction of a rotation axis of the roller.

4. A rubbing roller comprising:

a rubbing cloth wound around a surface of the rubbing roller, the rubbing cloth including pile yarns which are implanted at cyclic intervals in two directions perpendicular to each other, wherein the rubbing cloth is rectangular, one of implanting directions of pile yarns is parallel to one edge of the rubbing cloth, and the edge of the rubbing cloth is wound spirally with an inclination with respect to the direction of a rotation axis of the roller, wherein an angle $\theta 5$ formed by one of implanting directions of the pile yarns and a rotation axis of the rubbing roller is selected to be in a range of between 10 and 60 degrees.

5. A rubbing method comprising the steps of:

forming a plurality of strip-shaped electrodes parallel to each other on a substrate;

forming a film-to-be-treated which is rubbed on the substrate so that the film-to-be-treated covers the strip-shaped electrodes; and providing a rubbing roller having an axis of rotation and including a rubbing cloth wound around a surface thereof to be adhered, the rubbing cloth including pile yarns which are implanted at cyclic intervals in two directions perpendicular to each other, the rubbing roller being for contacting a surface of the film-in-to-be-treated, the rubbing roller to be moved together with the substrate in relation to each other to thereby perform rubbing treatment on the surface of the film-to-be-treated wherein the rotation axis of the rubbing roller is parallel to the surface during the rubbing treatment;

rubbing a surface of the film-to-be-treated using the rubbing roller, wherein an angle $\theta 3$ in a plane parallel to the surface of the film-to-be-treated is formed by one of the implanting directions of the pile yarns of the rubbing roller and the longitudinal direction of the strip-shaped electrodes of the substrate and is selected to be in a range of from −5 degrees to +5 degrees and wherein an angle $\theta 5$ formed by the direction of a rotation axis of the rubbing roller and one of the implanting directions of the pile yarns is selected to be in a range between 10 and 60 degrees.

6. A liquid crystal display device comprising:

a pair of substrate members, at least either one of the pair of substrate members being capable of transmitting light, and a liquid crystal disposed between the pair of substrate members, wherein at least either one of the substrate members includes an alignment film which is rubbed using a rubbing treatment apparatus comprising:

a rubbing roller having an axis of rotation and including a rubbing cloth wound around a surface thereof to be adhered, the rubbing cloth including pile yarns which are implanted at cyclic internals in two directions perpendicular to each other, the rubbing roller being for contacting a surface of the alignment film which is formed so as to cover a plurality of strip-shaped electrodes formed parallel to each other on a substrate member, the rubbing roller to be moved together with the substrate member in relation to each other to thereby perform rubbing treatment on the surface of the alignment film, wherein the rotation axis of the rubbing roller is parallel to the surface of the alignment film during the rubbing treatment, wherein an angle $\theta 3$ in a plane parallel to the surface of the alignment film is formed by one of the implanting directions of the pile yarns of the rubbing roller and the longitudinal direction of the strip-shaped electrodes of the substrate member and is selected to be in a range of from −5 degrees to +5 degrees, and wherein an angle $\theta 5$ formed by the direction of a rotation axis of the rubbing roller and one of the implanting directions of the pile yarns is selected to be in a range between 10 and 60 degrees.

7. The liquid crystal display apparatus of claim 6, wherein the liquid crystal which is disposed between the substrate members is an STN liquid crystal with liquid crystal molecules aligned twisted between the substrate members in the range of 210 to 260 degrees.

* * * * *

UNITED STATES PATENT AND TRADEMARK OFFICE
CERTIFICATE OF CORRECTION

PATENT NO. : 6,313,897 B1
DATED : November 6, 2001
INVENTOR(S) : Murayama et al.

It is certified that error appears in the above-identified patent and that said Letters Patent is hereby corrected as shown below:

Title page,
Please correct Inventors to read: [75] Inventors: Shinichi Murayama, Sakai; Keizo, Fujii, Kashiwara; all of (JP)

Signed and Sealed this

Twenty-eighth Day of May, 2002

*Attest:*

*Attesting Officer*

JAMES E. ROGAN
*Director of the United States Patent and Trademark Office*